US011575933B2

(12) United States Patent
He et al.

(10) Patent No.: US 11,575,933 B2
(45) Date of Patent: Feb. 7, 2023

(54) BI-DIRECTIONAL OPTICAL FLOW METHOD WITH SIMPLIFIED GRADIENT DERIVATION

(71) Applicant: VID SCALE, INC., Wilmington, DE (US)

(72) Inventors: Yuwen He, San Diego, CA (US); Xiaoyu Xiu, San Diego, CA (US); Yan Ye, San Diego, CA (US)

(73) Assignee: VID Scale, Inc., Wilmington, DE (US)

( * ) Notice: Subject to any disclaimer, the term of this patent is extended or adjusted under 35 U.S.C. 154(b) by 0 days.

(21) Appl. No.: 17/045,683

(22) PCT Filed: Apr. 5, 2019

(86) PCT No.: PCT/US2019/025933
§ 371 (c)(1),
(2) Date: Oct. 6, 2020

(87) PCT Pub. No.: WO2019/195643
PCT Pub. Date: Oct. 10, 2019

(65) Prior Publication Data
US 2021/0029378 A1 Jan. 28, 2021

Related U.S. Application Data

(60) Provisional application No. 62/653,674, filed on Apr. 6, 2018.

(51) Int. Cl.
*H04N 19/00* (2014.01)
*H04N 19/577* (2014.01)
(Continued)

(52) U.S. Cl.
CPC ......... *H04N 19/577* (2014.11); *H04N 19/103* (2014.11); *H04N 19/139* (2014.11); *H04N 19/176* (2014.11)

(58) Field of Classification Search
CPC ..................................... H04N 19/00
See application file for complete search history.

(56) References Cited

U.S. PATENT DOCUMENTS

| 2017/0094305 A1 | 3/2017 | Li et al. |
| 2018/0192071 A1 | 7/2018 | Chuang et al. |

(Continued)

FOREIGN PATENT DOCUMENTS

| CN | 105847804 A | 8/2016 |
| EP | 3340620 A1 | 6/2018 |

(Continued)

OTHER PUBLICATIONS

"JEM-7.0 Reference Software", Available at <https://jvet.hhi.fraunhofer.de/svn/svn_HMJEMSoftware/tags/HM-16.6-JEM-7.0>, 1 page.

(Continued)

*Primary Examiner* — Maryam A Nasri
(74) *Attorney, Agent, or Firm* — Condo Roccia Koptiw LLP

(57) ABSTRACT

A video coding device may be configured to perform directional Bi-directional optical flow (BDOF) refinement on a coding unit (CU). The device may determine the direction in which to perform directional BDOF refinement. The device may calculate the vertical direction gradient difference and the horizontal direction gradient difference for the CU. The vertical direction gradient difference may indicate the difference between the vertical gradients for a first reference picture and the vertical gradients for a second reference picture. The horizontal direction gradient difference may indicate the difference between the horizontal gradients for the first reference picture and the horizontal gradients for the second reference picture. The video coding device may determine the direction in which to perform directional BDOF refinement based on the vertical direction gradient (Continued)

difference and the horizontal direction gradient difference. The video coding device may perform directional BDOF refinement in the determined direction.

20 Claims, 17 Drawing Sheets

(51) Int. Cl.
*H04N 19/103* (2014.01)
*H04N 19/139* (2014.01)
*H04N 19/176* (2014.01)

(56) References Cited

U.S. PATENT DOCUMENTS

| | | | |
|---|---|---|---|
| 2018/0249172 A1* | 8/2018 | Chen | H04N 19/176 |
| 2018/0262773 A1 | 9/2018 | Chuang et al. | |
| 2018/0278949 A1 | 9/2018 | Karczewicz et al. | |
| 2019/0045214 A1 | 2/2019 | Ikai et al. | |
| 2019/0045215 A1 | 2/2019 | Chen et al. | |
| 2020/0221122 A1 | 7/2020 | Ye et al. | |
| 2021/0281869 A1 | 9/2021 | Ugur et al. | |

FOREIGN PATENT DOCUMENTS

| | | |
|---|---|---|
| RU | 2565363 C2 | 10/2015 |
| WO | 2017/034089 A1 | 3/2017 |
| WO | 2017/036399 A1 | 3/2017 |
| WO | 2018021373 A1 | 2/2018 |

OTHER PUBLICATIONS

"JM Reference Software JM16.1", Available at <http://iphome.hhi.de/suehring/tml/download/jm16.1.zip>, Sep. 2009.
Alshin et al., "AHG6: On Bio Memory Bandwidth", JVET-D0042, Samsung Electronics Ltd., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.
Alshin et al., "Bi-Directional Optical Flow for Improving Motion Compensation", Samsung Electronics Co., Ltd., 28th Picture Coding Symposium, PCS2010, Nagoya, Japan, Dec. 8-10, 2010, pp. 422-425.
Alshina et al., "Bi-Directional Optical Flow", JCTVC-C204, Samsung Electronics Co., Ltd., Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, pp. 1-6.
Alshina et al., "Known Tools Performance Investigation for Next Generation Video Coding", VCEG-AZ05, ITU—Telecommunications Standardization Sector, Study Group 16 Question 6, Video Coding Experts Group (VCEG), 52nd Meeting, Warsaw, Poland, Jun. 19-26, 2015, 5 pages.
Bross et al., "High Efficiency Video Coding (HEVC) Text Specification Draft 10", JCTVC-L1003, Joint Collaborative Team on Video Coding (JCT-VC) of ITU-T SG16 WP3 and ISO/IEC JTC1/SC29/WG11, 12th Meeting: Geneva, CH, Jan. 14-23, 2013.
Chen et al., "Algorithm Description of Joint Exploration Test Model 7 (JEM 7)", JVET-G1001-v1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.
Chen et al., "Coding Tools Investigation for Next Generation Video Coding", ITU-T SG16, COM 16-C 806, Feb. 2015, 7 pages.
ITU-T, "Advanced Video Coding for Generic Audiovisual Services", ITU-T Rec H.264 and ISO/IEC/MPEG 4 Part 10, Nov. 2007, 564 pages.
Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.
Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.
SMPTE, "VC-1 Compressed Video Bitstream Format and Decoding Process", SMPTE 421M, Apr. 2006, 493 pages.
Xiu et al., "Description of SDR, HDR and 360° Video Coding Technology Proposal by InterDigital Communications and Dolby Laboratories", JVET-J0015-V1, InterDigital Communications, Inc., Dolby Laboratories, Inc., Joint Video Experts Team (JVET) of ITU-T SG 16 WP 3 and ISO/IEC JTC1/SC 29/WG 11, 10th Meeting: San Diego, US, Apr. 10-20, 2018, 82 pages.
"JEM-6.0 Reference Software", Available at <https://jvet.hhi.fraunhofer.de/svn/svn_HMJEMSoftware/tags/HM-16.6-JEM-6.0>, 1 page.
Chen et al., "Algorithm Description of Joint Exploration Test Model 6 (JEM 6)", JVET-F1001-V2, Editors, Joint Video Exploration Team (JVET) of ITU-T SG 16 WP 3 and ISO/IEC JTC 1/SC 29/WG 11, Hobart, AU, Mar. 31-Apr. 7, 2017, 49 pages.
Chuang et al., "A Block-Based Design for Bi-Directional Optical Flow (Bio)", JVET-F0022, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-3.
Lee et al., "Bio Improvement to Reduce the Encoder and Decoder Complexities", JVET-C0031, LG Electronics, Joint Video Exploration Team (JVET) of ITU-T SG 16 WP 3 and ISO/IEC JTC 1/SC 29/WG 11, 3rd Meeting: Geneva, CH, May 26-31, 2016, pp. 1-4.
Wikipedia, "SIMD", Available at <https://en.wikipedia.org/wiki/SIMD>, pp. 1-8.

* cited by examiner

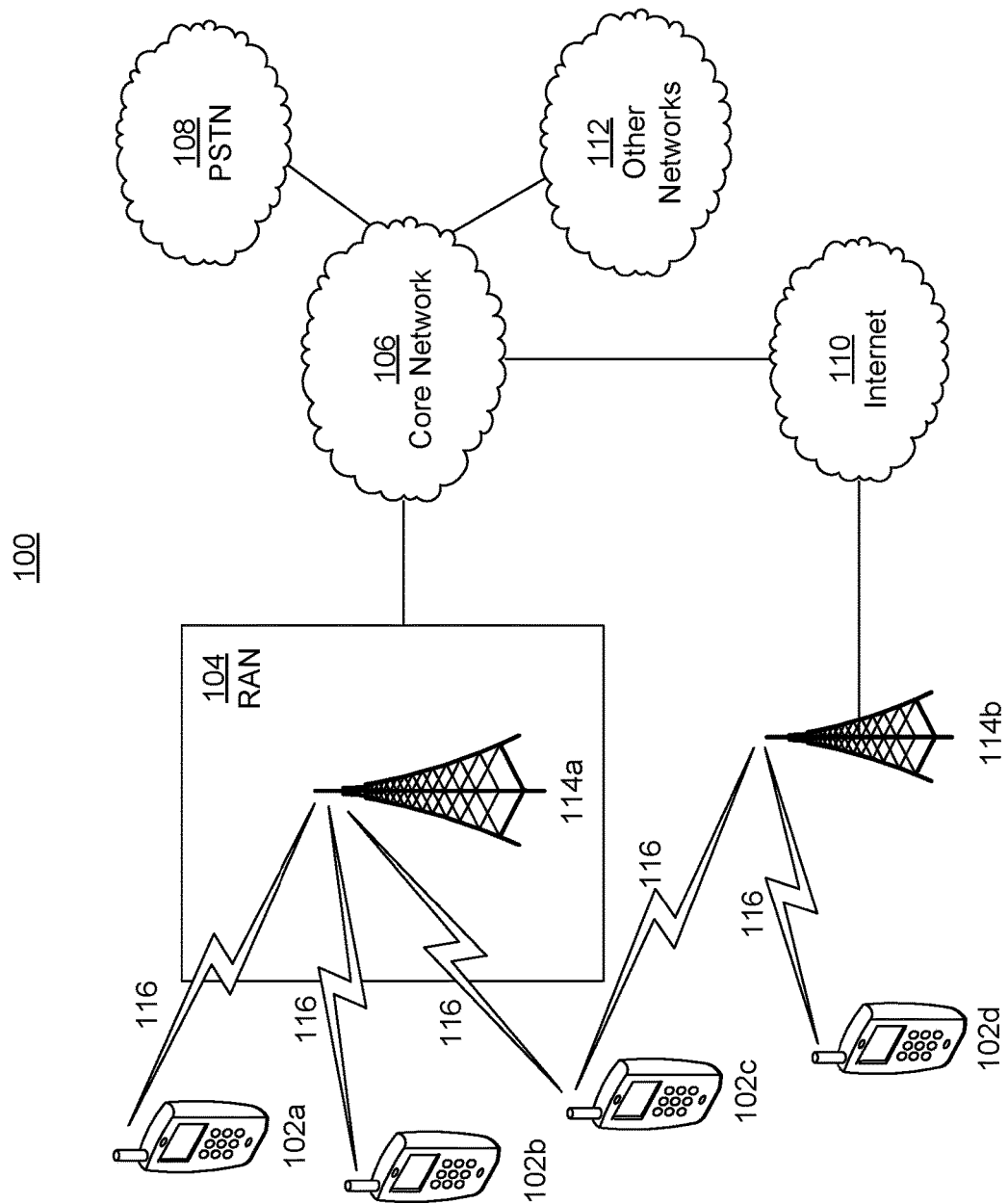

BI-DIRECTIONAL OPTICAL FLOW METHOD WITH SIMPLIFIED GRADIENT DERIVATION

CROSS REFERENCE

This application is the National Stage Entry under 35 U.S.C. § 371 of Patent Cooperation Treaty Application No. PCT/US2019/025933, filed Apr. 5, 2019, which claims the benefit of U.S. Provisional Application No. 62/653,674, filed Apr. 6, 2018 the contents of which are incorporated by reference herein.

BACKGROUND

Video coding systems are widely used to compress digital video signals to reduce the storage needs and/or transmission bandwidth of such signals. Among the various types of video coding systems, such as block-based, wavelet-based, and object-based systems, block-based hybrid video coding systems are widely used and deployed. Examples of block-based video coding systems may include international video coding standards such as the MPEG1/2/4 part 2, H.264/MPEG-4 part 10, AVC, VC-1, and High Efficiency Video Coding (HEVC).

SUMMARY

A video coding device may be configured to perform directional Bi-directional optical flow (BDOF) refinement on a coding unit (CU). A video coding device may be or may include an encoder and/or a decoder. Video coding may refer to encoding and/or decoding. The device may determine the direction in which to perform directional BDOF refinement. The device may calculate the vertical direction gradient difference and the horizontal direction gradient difference for the CU. The vertical direction gradient difference may indicate the difference between the vertical gradients in a first reference picture and the vertical gradients for a second reference picture. The horizontal direction gradient difference may indicate the difference between the horizontal gradients in the first reference picture and the horizontal gradients for the second reference picture. The video coding device may determine the direction in which to perform directional BDOF refinement based on the vertical direction gradient difference and the horizontal direction gradient difference. The video coding device may perform directional BDOF refinement in the determined direction. For example, directional BDOF refinement may include performing BDOF refinement in the vertical direction or performing directional BDOF refinement in the horizontal direction.

A video coding device may be configured to determine the direction in which directional BDOF refinement is performed. As described herein, the direction in which directional BDOF refinement is performed may be based on the vertical direction gradient difference associated with a CU and the horizontal direction gradient difference associated with the CU. The video coding deice may compare the gradient differences to a threshold (e.g., a first threshold and/or a second threshold). The video coding device may perform directional BDOF refinement in the vertical direction when the vertical directional gradient difference associated with the CU is greater than the first threshold. The video coding device may perform directional BDOF refinement in the horizontal direction when the horizontal direction gradient difference associated with the CU is greater than the second threshold. The first threshold and the second threshold may be variable, static (e.g., pre-configured), or semi-static. For example, the first threshold and the second threshold may be variable, and the first threshold may be or may include the horizontal direction gradient difference and the second threshold may be or may include the vertical direction gradient difference.

A video coding device may be configured to determine whether to perform BDOF refinement on a CU, which may include: performing directional BDOF refinement in the vertical direction, performing directional BDOF refinement in the horizontal direction, or performing BDOF refinement in the horizontal direction and the vertical direction. The video coding device may be configured to determine whether to perform BDOF refinement on the CU based on one or more characteristics associated with the CU. The video coding device may determine whether to perform BDOF refinement based on the inter coding mode associated with the CU and/or the size associated with the CU. For example, the video coding device may determine to skip BDOF refinement if the inter coding mode associated with the CU supports sub-CU prediction.

A video coding device may be configured to perform BDOF refinement on a CU. The video coding device may identify a motion vector associated with a reference CU of the CU. The motion vector may include one or more motion components (e.g., a first motion component and a second motion component). A motion component may include an integer motion component or a non-integer (e.g., fractional) motion component. For example, the motion component may include a non-integer motion component. The device may calculate a directional gradient associated with the CU, for example, by applying a gradient filter to the reference samples at the integer positions of a reference CU. If, for example, the motion component includes a non-integer motion component, the video coding device may identify an integer position that corresponds to the non-integer motion component. The video coding device may apply a gradient filter to the reference samples at the integer positions of the reference CU in a first direction. For example, one or more reference sample(s) at the integer positions associated with the reference CU may approximate their corresponding sample(s) at the fractional position in the reference CU. The directional gradient associated with the CU may be used to calculate the vertical direction gradient difference for the CU or the horizontal direction gradient difference associated with the CU.

BRIEF DESCRIPTION OF THE DRAWINGS

FIG. 1A is a system diagram illustrating an example communications system in which one or more disclosed embodiments may be implemented.

DETAILED DESCRIPTION

Figure 1B:
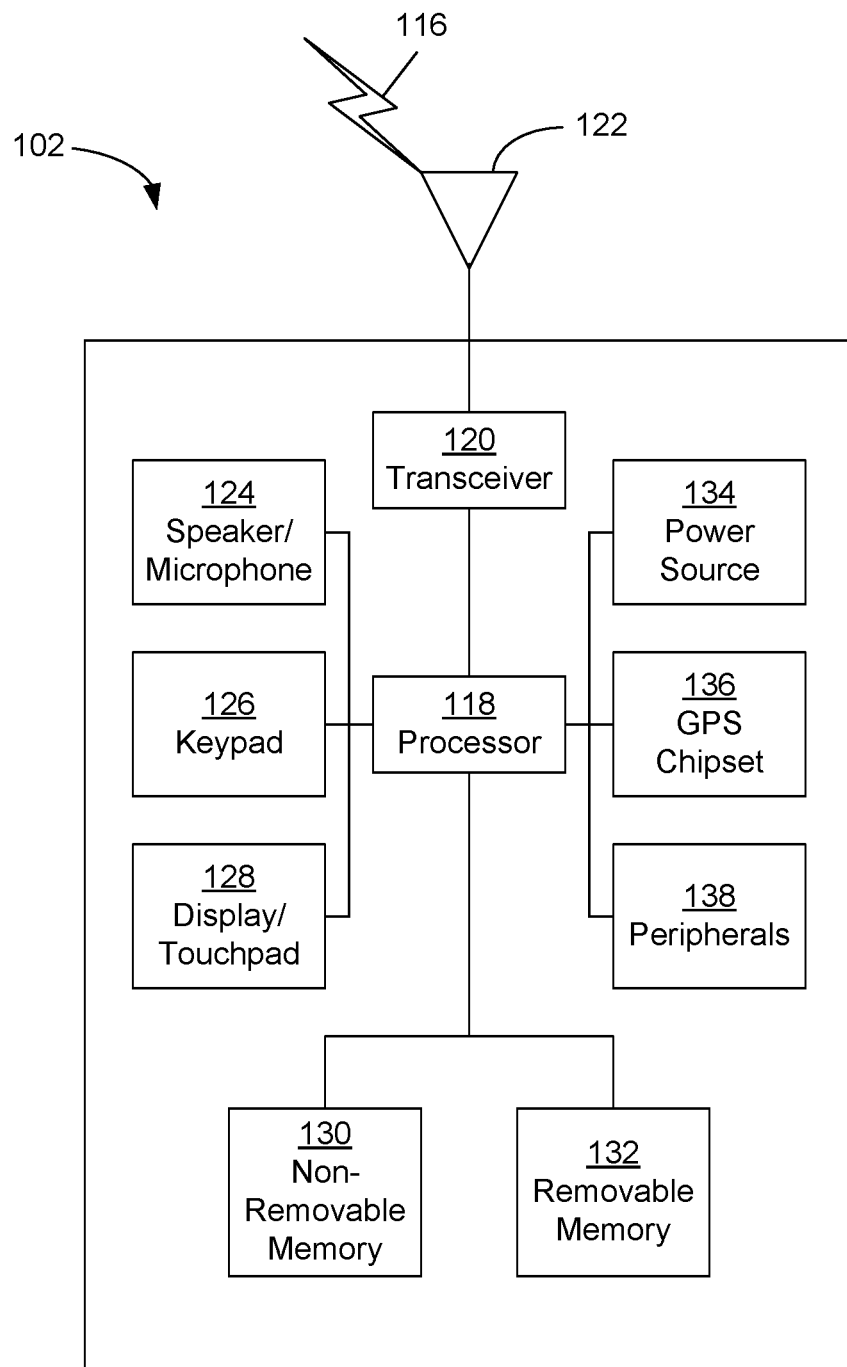
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
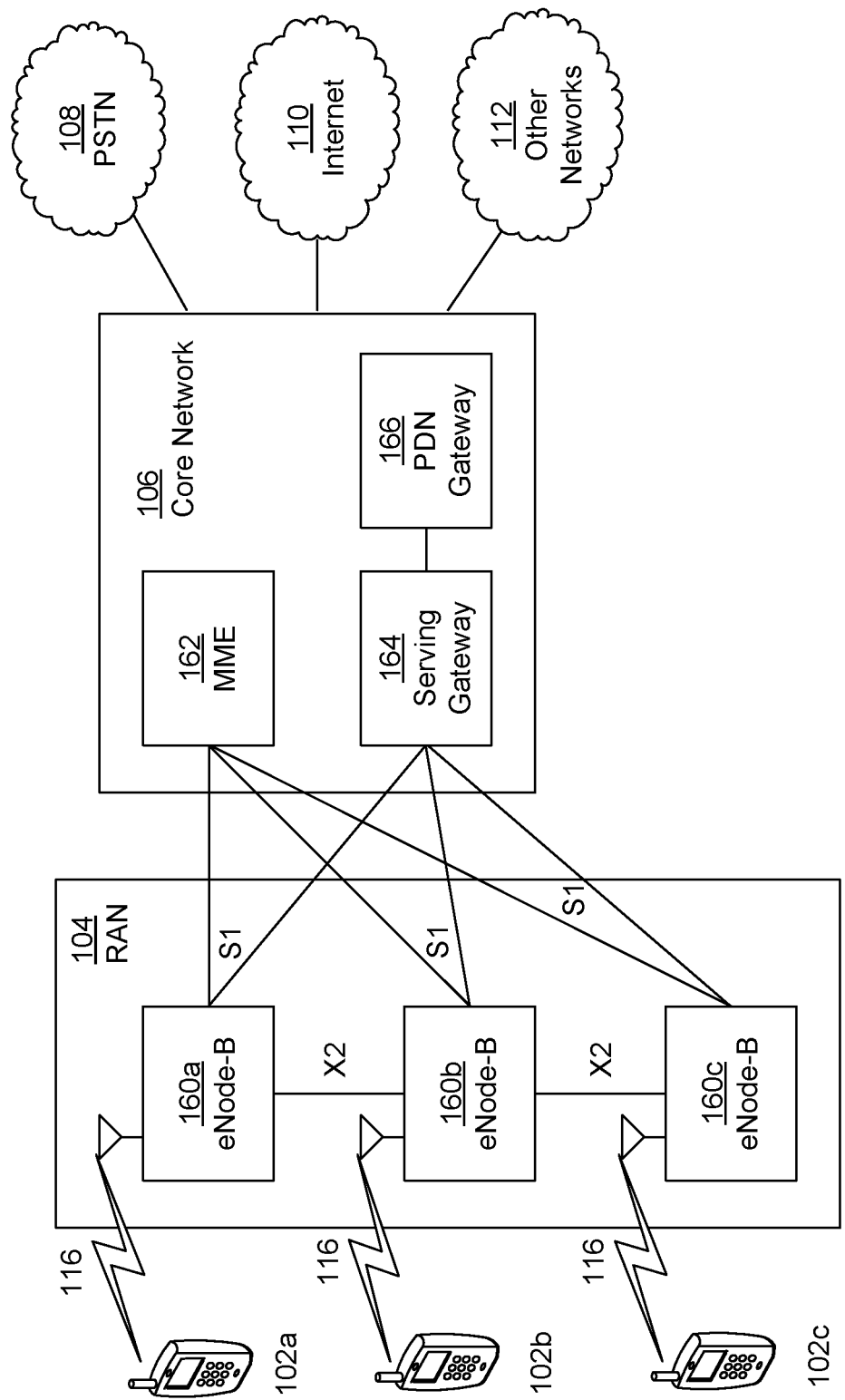
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
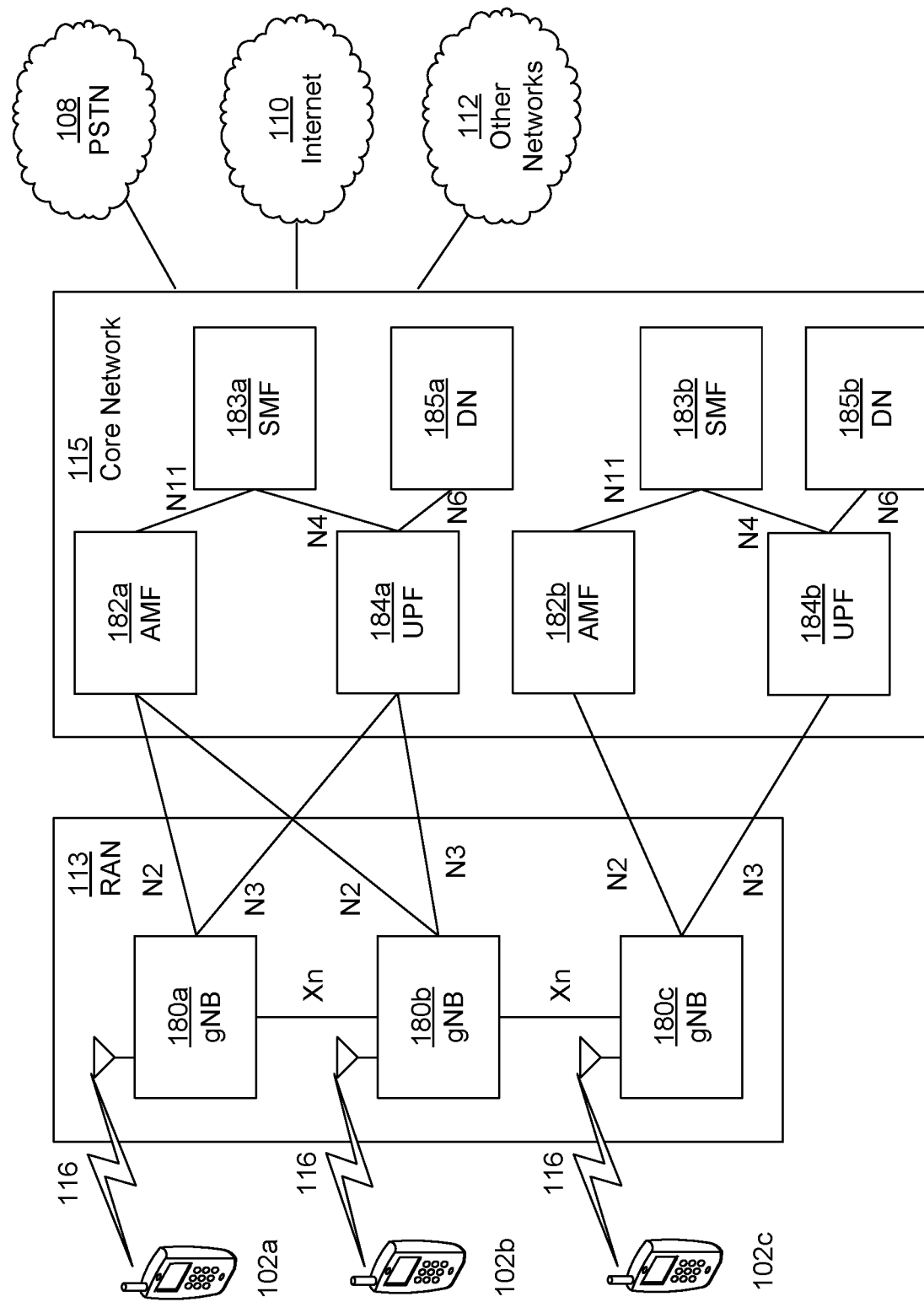
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Bi-directional optical flow (BDOF) may be performed, for example, to enhance the efficiency of bi-predictive prediction. BDOF may improve the granularity and/or the accuracy of the motion vectors that are used during motion compensation. BDOF may improve coding performance. BDOF may increase complexity at a coding device (e.g., encoder and/or decoder).

Video coding systems may be used to compress digital video signals to reduce a storage need and/or a transmission bandwidth of such signals. There may be a number of types of video coding systems, such as block-based, wavelet-based, object-based, and the like. For example, block-based hybrid video coding systems may be widely used and deployed. Examples of block-based video coding systems may be compliant with one or more international video coding standards such as MPEG1/2/4 part 2, H.264/MPEG-4 part 10 AVC, VC-1. Examples of block-based video coding systems may also include the video coding standard High Efficiency Video Coding (HEVC), which was developed by JCT-VC (Joint Collaborative Team on Video Coding) of ITU-T/SG16/Q.6/VCEG and ISO/IEC/MPEG.

Figure 2:
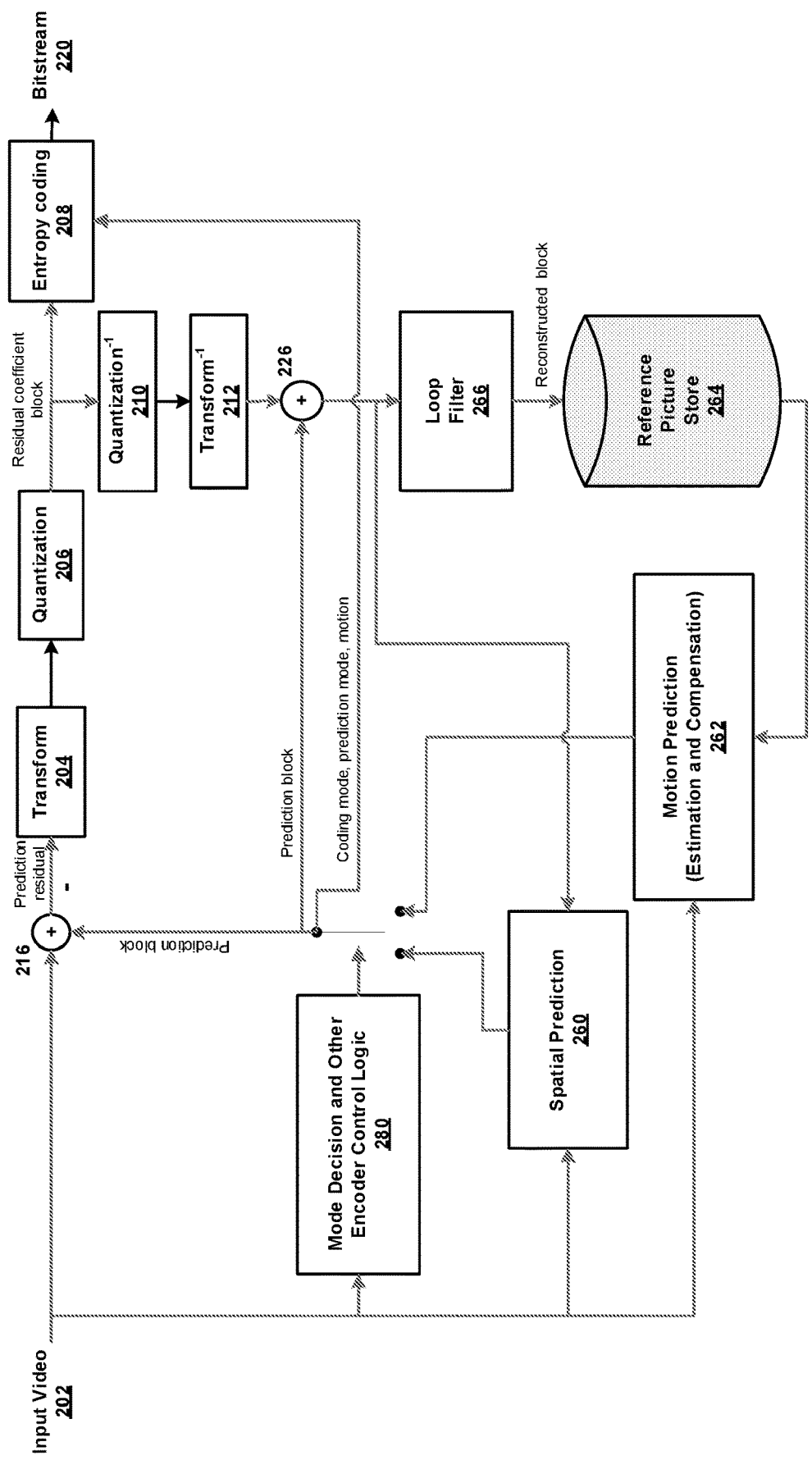
FIG. 2 shows a block diagram of a video encoder.

FIG. 2 illustrates a diagram of a block-based video encoder that may be built upon a block-based hybrid video coding framework. FIG. 2 shows a block diagram of a block-based video encoding system that may be a block-based hybrid video encoding system. The input video signal 202 may be processed block by block. Extended block sizes (which may be called a coding unit or CU) may be used to efficiently compress high resolution (e.g. 1080 p and beyond) video signals. A CU may be up to 64×64 pixels. A CU may be further partitioned into prediction units (PU), for which separate prediction methods may be applied. For an input video block (MB or CU), e.g. one or more input video blocks, spatial prediction (260) and/or temporal prediction (262) may be performed. Spatial prediction or intra prediction may uses pixels from the samples of already coded neighboring blocks, which may be called reference samples, in the same video picture/slice to predict the current video block. Spatial prediction may reduce the spatial redundancy that may be inherent in the video signal. Temporal prediction, which may be referred to as inter prediction or motion compensated prediction, may use reconstructed pixels from the already coded video pictures to predict the current video block. Temporal prediction may reduce the temporal redundancy that may be inherent in the video signal. A temporal prediction signal for a given video block may be signaled by one or more motion vectors that may indicate the amount and the direction of motion between the current block and its reference block. If multiple reference pictures are supported, a reference picture index may be sent for a video block (e.g., each video block). The reference picture index may be used to identify which reference picture in the reference picture store (264) a temporal prediction signal comes from. After spatial and/or temporal prediction, the mode decision (280) in the encoder may choose a prediction mode, for example, based on the rate-distortion optimization method. The prediction mode chosen may be the best prediction mode for the circumstances. The prediction block may be subtracted from the current video block (216), and the prediction residual may be de-correlated using transform block (204) and quantization block (206). The quantized residual coefficients may be inversely quantized (210) and inversely transformed (212) to form the reconstructed residual, which may be added back to the prediction block (226) to form the reconstructed video block. Further in-loop filtering such as de-blocking filter and Adaptive Loop Filters may be applied (266) on the reconstructed video block, for example, before the reconstructed video block is put in the reference picture store (264) and used to code future video blocks. To form the output video bit-stream 220, coding mode (e.g. inter or intra), prediction mode information, motion information, and quantized residual coefficients may be sent to an entropy coding unit (208) to be further compressed and packed to form the bit-stream.

Figure 3:
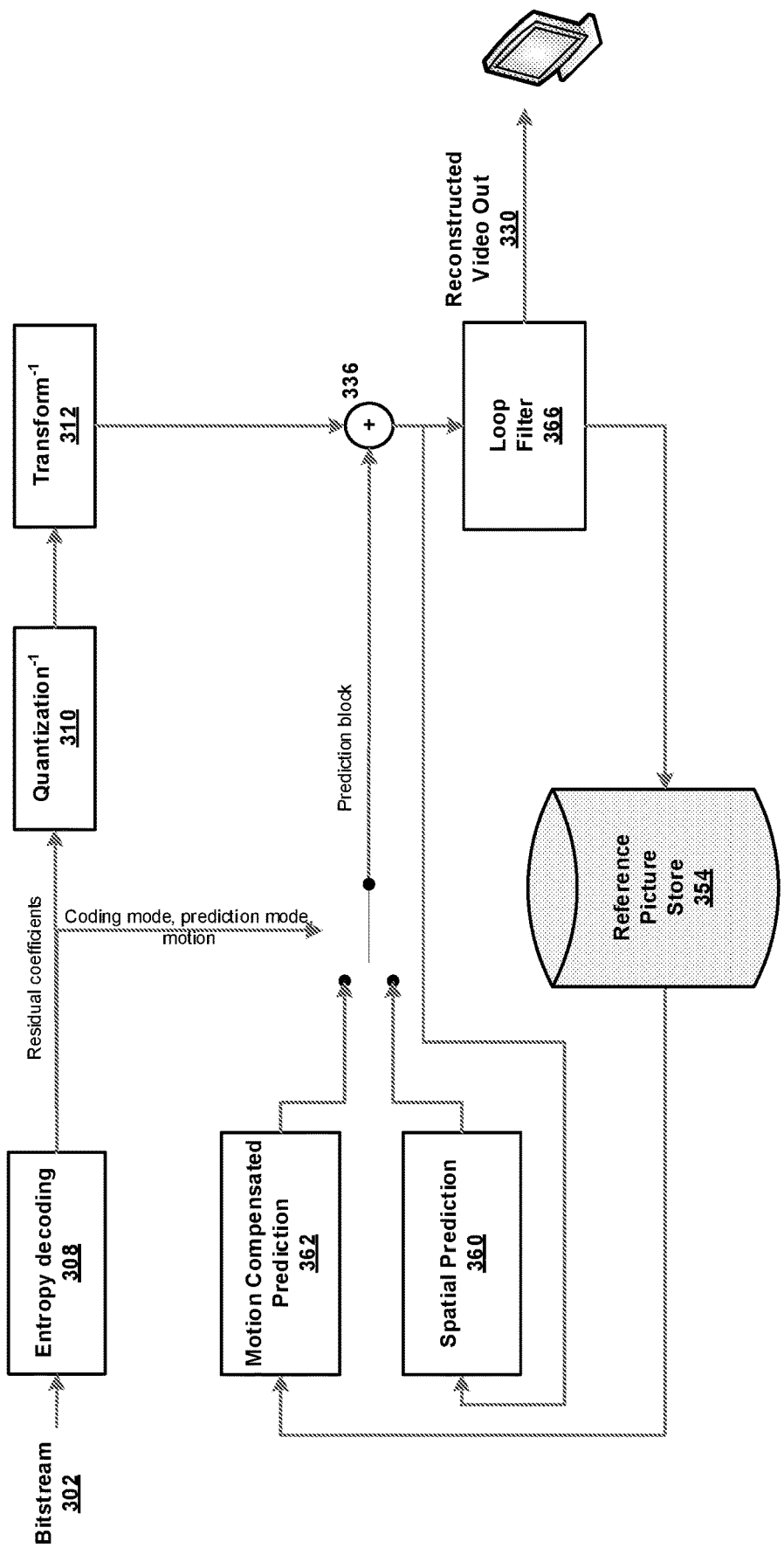
FIG. 3 shows a block diagram of video decoder.

FIG. 3 shows a block diagram of video decoder, which may be a block-based video decoder. The video bit-stream 302 may be unpacked and entropy decoded at entropy decoding 308. The coding mode and prediction information may be sent to spatial prediction 360 (e.g. intra coded) or motion compensated prediction 362 (e.g. inter coded) to form a prediction block. The residual transform coefficients may be sent to inverse quantization 310 and inverse transform 312 to reconstruct the residual block. The prediction block and the residual block may be added together at 336. The reconstructed block may further go through in-loop filtering before it may be stored in reference picture store 354. The reconstructed video in reference picture store may be then sent out to drive a display device, and may be used to predict future video blocks.

As shown in FIGS. 2 and 3, encoding/decoding workflows may be based on , for example, one or more of the following: spatial prediction (e.g., intra prediction); temporal prediction (e.g., inter prediction); transform; quantization; entropy coding; loop filters; and/or the like.

Bi-directional optical flow (BDOF) may be used for motion vector derivation. For example, bi-predication may be based on an optical flow model. Bi-prediction in video coding may include combining two temporal prediction blocks that may be obtained from the reconstructed reference pictures. Due to the limitation of block-based motion compensation (MC), there may be remaining small motion that may be observed between the two prediction blocks, which may reduce the efficiency of motion compensated prediction. BDOF may be applied, for example, to compensate for small motion within the samples inside a block. BDOF may include the application of sample-wise motion refinement. The sample-wise motion refinement may be performed on top of the block-based motion-compensated predictions, for example, when bi-prediction is used. A motion vector (e.g., a refined motion vector) may be derived for the samples in a block. The motion vector derivation may be based on an optical flow model (e.g., the classical optical flow model). For example, let $I^{(k)}(x, y)$ be the sample value at the coordinate (x, y) of a prediction block derived from the reference picture list k (k=0, 1), where $\partial I^{(k)}(x, y)/\partial x$ and $\partial I^{(k)}(x, y)/\partial y$ may include the horizontal and vertical gradients of the sample, respectively. Motion refinement parameters $(v_x, v_y)$ for the coordinate (x, y) may be derived using an optical flow model:

$$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0 \quad (1)$$

With the combination of the optical flow equation (1) and the interpolation of the prediction blocks along the motion trajectory (e.g., as show in FIG. 4), BDOF prediction may be obtained as:

$$pred_{BDOF}(x, y) = \frac{1}{2} \cdot \begin{bmatrix} I^{(0)}(x, y) + I^{(1)}(x, y) + \\ \frac{v_x}{2}\left(\tau_1 \frac{\partial I^{(1)}(x, y)}{\partial x} - \tau_0 \frac{\partial I^{(0)}(x, y)}{\partial x}\right) + \\ \frac{v_y}{2}\left(\tau_1 \frac{\partial I^{(1)}(x, y)}{\partial x} - \tau_0 \frac{\partial I^{(0)}(x, y)}{\partial y}\right) \end{bmatrix} \quad (2)$$

Referring to (2), $\tau_0$ and $\tau_1$ may include the temporal distances of the reference pictures $Ref_0$ and $Ref_1$ associated with $I^{(0)}$ and $I^{(1)}$ to the current picture CurPic, e.g., $\tau_0 = POC(CurPic) - POC(Ref_0)$ $\tau_1 = POC(Ref_1) - POC(CurPic)$ \quad (3)

Figure 4:
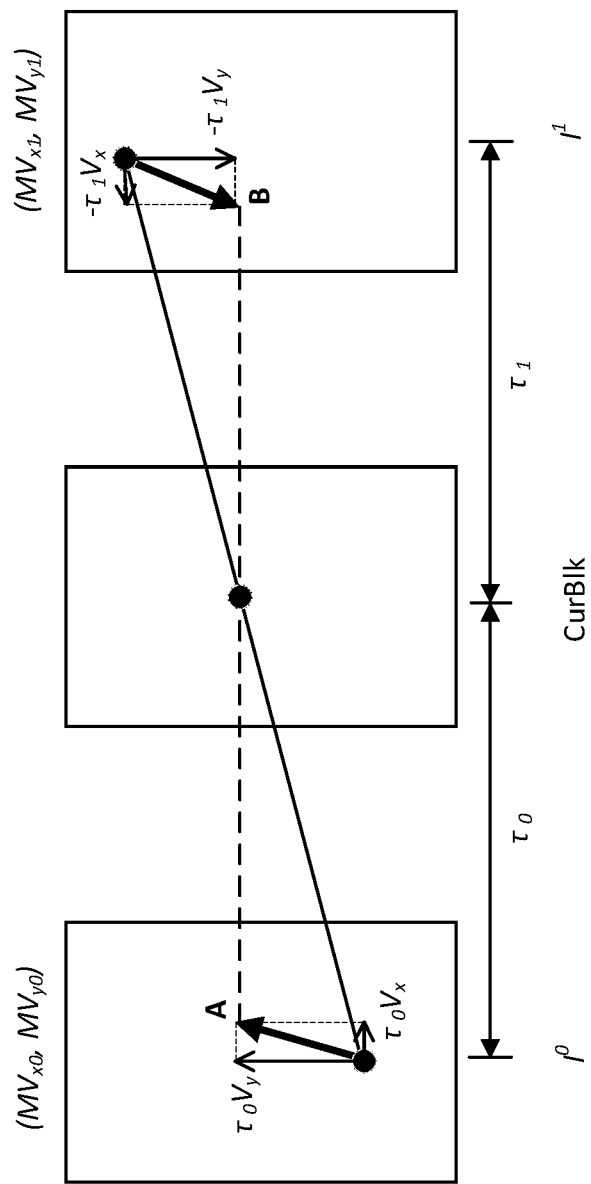
FIG. 4 shows an example associated with bidirectional optical flow (BDOF).

FIG. 4 shows an example application of BDOF. In FIG. 4, $(MV_{x0}, MV_{y0})$ and $(MV_{x1}, MV_{y1})$ may indicate the block-level motion vectors that may be used to generate the two prediction blocks $I^{(0)}$ and $I^{(1)}$. The motion refinement parameters $(v_x, v_y)$ at the sample location (x, y) may be calculated by minimizing the difference $\Delta$ between the values of the samples after motion refinement compensation (e.g., A and B in FIG. 4), as shown as:

$$\Delta(x, y) = I^{(0)}(x, y) - I^{(1)}(x, y) + v_x\left(\tau_1 \frac{\partial I^{(1)}(x, y)}{\partial x} + \tau_0 \frac{\partial I^{(0)}(x, y)}{\partial x}\right) + v_y\left(\tau_1 \frac{\partial I^{(1)}(x, y)}{\partial y} + \tau_0 \frac{\partial I^{(0)}(x, y)}{\partial y}\right) \quad (4)$$

The regularity of the derived motion refinement may be maintained. The motion refinement may be consistent within a local surrounding area centered at (x, y). In the BDOF design, the values of $(v_x, v_y)$ may be derived by minimizing $\Delta$ inside the 5×5 window $\Omega$ around the current sample at (x, y) as:

$$(v_x^*, v_y^*) = \underset{(v_x, v_y)}{\operatorname{argmin}} \sum_{(i,j)} \Delta^2(i, j) \quad (5)$$

BDOF may be applied to bi-prediction blocks. Bi-prediction coded blocks may be predicted by two or more reference blocks from temporal neighboring pictures. BDOF may be enabled, for example, without sending additional information from encoder to decoder. For example, the BDOF may be applied to the bi-directionally predicted blocks which have forward and backward prediction signals (e.g., $\tau_0 \cdot \tau_1 > 0$). If the two prediction blocks of the current blocks are from the same direction (either the forward or the backward direction, e.g., $\tau_0 \cdot \tau_1 < 0$), BDOF may applied when the two prediction blocks are associated with non-zero motions, e.g., $abs(MV_{x0}) + abs(MV_{y0}) \neq 0$ and $abs(MV_{x1}) + abs(MV_{y1}) \neq 0$, and the two motion vectors may be proportional to the temporal distances between the current picture and the reference pictures, e.g., $$\frac{MV_{x0}}{MV_{x1}} = \frac{MV_{y0}}{MV_{y1}} = \frac{\tau_0}{\tau_1} \quad (6)$$

If the two prediction blocks of the current block are from the same reference picture (e.g., $\tau_0 = \tau_1$), the BDOF may be disabled. When local illumination compensation (LIC) is used for a current block, BDOF may be disabled.

A gradient derivation process may be performed. As show in (2) and (4), for example, in addition to block-level MC, gradients may be derived in the BDOF for the samples of a motion compensated block (e.g., $I^{(0)}$ and $I^{(1)}$), which may be used to derive the local motion refinement and generate the predication at that sample location. In an example, the horizontal and vertical gradients of the samples in two prediction blocks $$\left(e.g., \frac{\partial I^{(0)}(x, y)}{\partial x}, \frac{\partial I^{(1)}(x, y)}{\partial x} \text{ and } \frac{\partial I^{(0)}(x, y)}{\partial y}, \frac{\partial I^{(1)}(x, y)}{\partial y}\right)$$

may be calculated, for example, when the prediction signals are generated based on the filtering processes. For example, motion compensated interpolation may be performed using 2D separable finite impulse response (FIR) filters. The horizontal and vertical gradients may be generated simultaneously. The input to a gradient derivation process may include the reference samples that are used for motion compensation. The input to a gradient derivation process may include the fractional components (fracX, fracY) of the input motion $(MV_{x0/x1}, MV_{y0/y1})$. To derive the gradient value at a sample position, two different filters (e.g., an interpolation filter $h_L$ and a gradient filter $h_G$) may be applied. The filters may be separately applied, for example, in different orders per the direction of the gradient that may be calculated. One or more of the following may apply.

When deriving horizontal gradients $$\left(\text{e.g., } \frac{\partial I^{(0)}(x,y)}{\partial x} \text{ and } \frac{\partial I^{(1)}(x,y)}{\partial x}\right),$$

the interpolation filter $h_L$ may be applied vertically to the samples inside the prediction block for deriving the sample values at the vertical fractional positions at fracY. The gradient filter $h_G$ may be applied horizontally to the generated vertical fractional samples to calculate the horizontal gradient values based on the value of fracX. For the derivation of vertical gradients $$\left(\frac{\partial I^{(0)}(x,y)}{\partial y} \text{ and } \frac{\partial I^{(1)}(x,y)}{\partial y}\right),$$

the gradient filter $h_G$ may be applied vertically, for example, on top of the prediction samples to calculate the intermediate vertical gradients corresponding to fracY, and may be followed by a horizontal interpolation of the intermediate vertical gradients using the interpolation filter $h_L$ according to the value of fracX. The lengths of the gradient filter and the interpolation filter may be 6-tap. 8-tap filters may be used for motion compensation. Tables 1 and 2 illustrate the filter coefficients that may be used for $h_G$ and $h_L$, respectively, according to the precision of the block-level motion vector (e.g., which may be up to $\frac{1}{16}$-pel).

TABLE 1

Filters that may be used for gradient calculation in BDOF

| Fractional position | Gradient filter ($h_G$) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 2

Interpolation filters that may be used for prediction signal generation in BDOF

| Fractional position | Interpolation filter ($h_L$) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

Figure 5A:
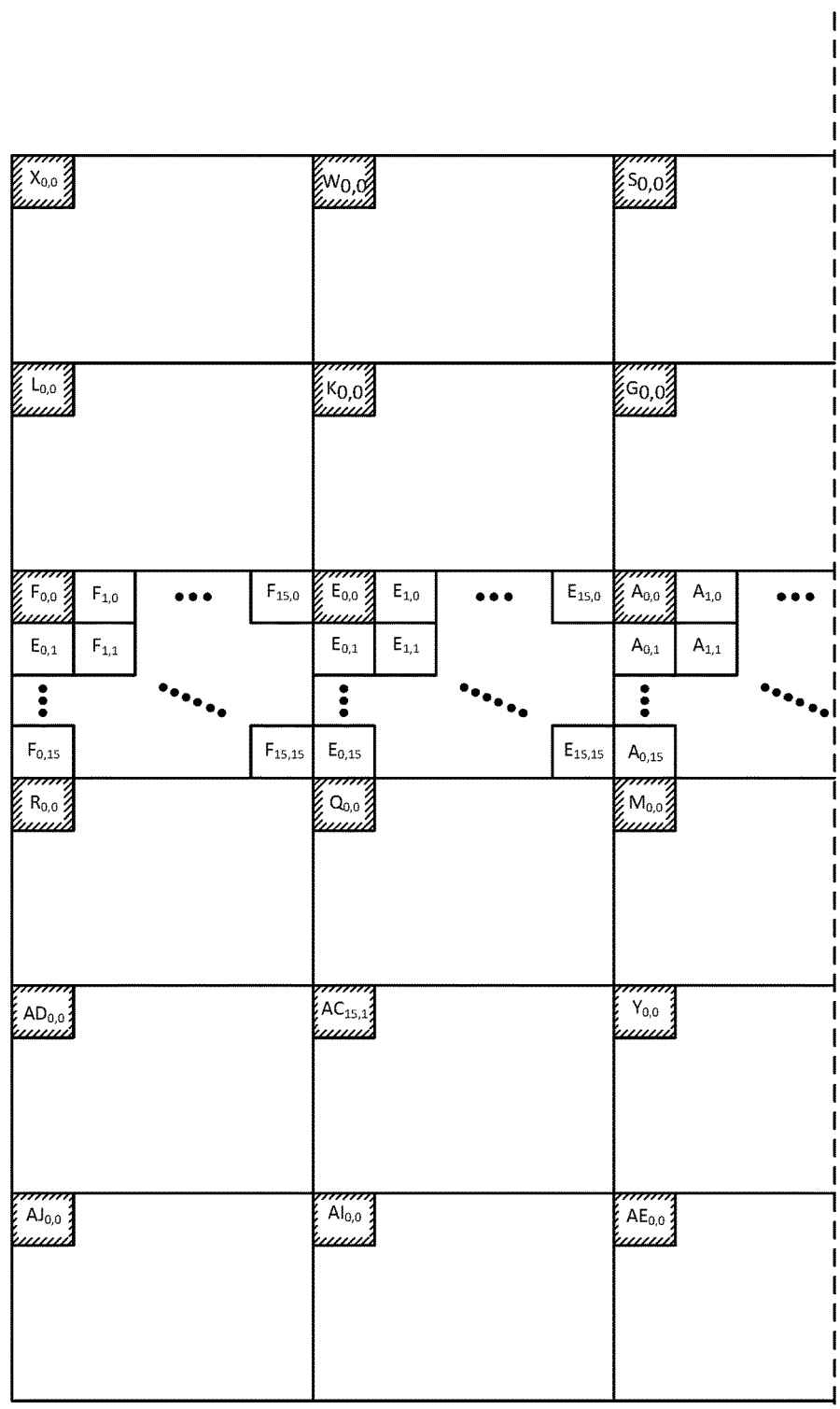
FIGS. 5A and 5B show an example of gradient derivation in the BDOF with a motion precision of 1/16-pel.
Figure 5B:
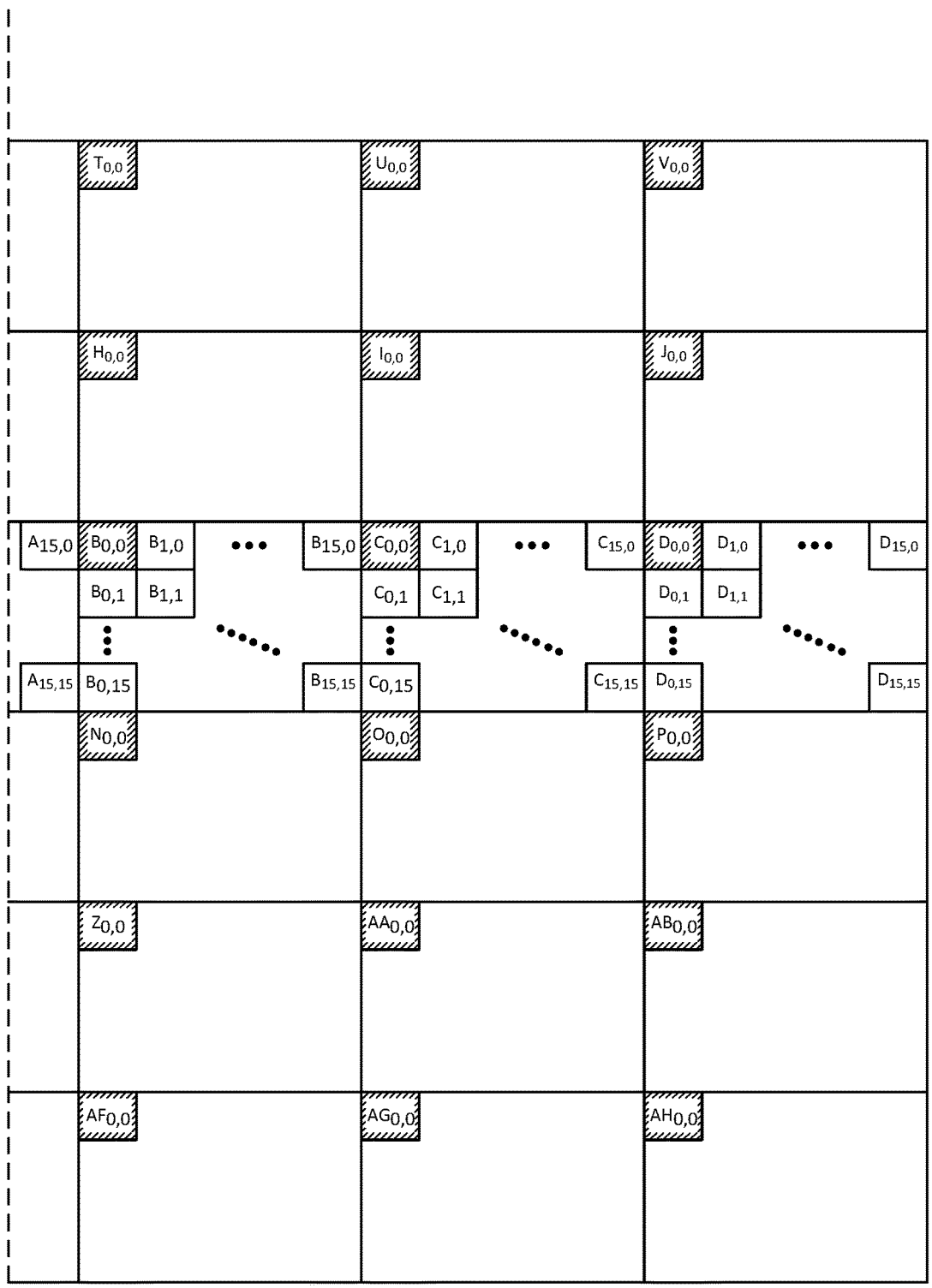

FIGS. 5A and 5B show an example of gradient derivation in the BDOF with a motion precision of $\frac{1}{16}$-pel. As shown in FIGS. 5A and 5B, a gradient derivation process may be applied in the BDOF, where the sample values at integer sample positions may be shown with patterned squares and the sample values at fractional sample positions may be shown with blank squares. Because the motion vector precision may be increased to $\frac{1}{16}$-pel, there may be a total of 255 fractional samples positions that may be defined within a region of an integer sample in FIGS. 5A and 5B. The subscript coordinate (x, y) may represent the corresponding horizontal and vertical fractional position of a sample (e.g., the coordinate (0, 0) that may correspond to the samples at the integer positions). The horizontal and vertical gradient values may be calculated at a fraction position (1, 1) (e.g., $a_{1,1}$). Based on the notations in FIGS. 5A and 5B, for horizontal gradient derivation, the fractional samples $f_{0,1}$, $e_{0,1}$, $a_{0,1}$, $b_{0,1}$, $c_{0,1}$ and $d_{0,1}$ may be derived by applying the interpolation filter $h_L$ in the vertical direction, e.g.:

$$f_{0,1} = (X_{0,0} - 3 \cdot L_{0,0} + 64 \cdot F_{0,0} + 4 \cdot R_{0,0} - 2 \cdot AD_{0,0} + \text{OffSet}_0) >> (B-8)$$

$$e_{0,1} = (W_{0,0} - 3 \cdot K_{0,0} + 64 \cdot E_{0,0} + 4 \cdot Q_{0,0} - 2 \cdot AC_{0,0} + \text{OffSet}_0) >> (B-8)$$

$$a_{0,1} = (S_{0,0} - 3 \cdot G_{0,0} + 64 \cdot A_{0,0} + 4 \cdot M_{0,0} - 2 \cdot Y_{0,0} + \text{OffSet}_0) >> (B-8)$$

$$b_{0,1} = (T_{0,0} - 3 \cdot H_{0,0} + 64 \cdot B_{0,0} + 4 \cdot N_{0,0} - 2 \cdot Z_{0,0} + \text{OffSet}_0) >> (B-8)$$

$$c_{0,1} = (U_{0,0} - 3 \cdot I_{0,0} + 64 \cdot C_{0,0} + 4 \cdot O_{0,0} - 2 \cdot AA_{0,0} + \text{OffSet}_0) >> (B-8)$$

$$d_{0,1} = (V_{0,0} - 3 \cdot J_{0,0} + 64 \cdot D_{0,0} + 4 \cdot P_{0,0} - 2 \cdot AB_{0,0} + \text{OffSet}_0) >> (B-8) \quad (7)$$

Referring to (7): B may include the bit-depth of the input signal, and $\text{OffSet}_0$ may include the rounding offset which may be equal to:

$$\text{OffSet}_0 = \begin{cases} 2^{B-9}, & B > 8 \\ 0, & B = 8 \end{cases} \quad (8)$$

The precision of $f_{0,1}$, $e_{0,1}$, $a_{0,1}$, $b_{0,1}$, $c_{0,1}$ and $d_{0,1}$ may be 14-bit. The horizontal gradient of $a_{1,1}$ may be calculated by applying the corresponding gradient filter $h_G$ horizontally to the derived fractional samples. One or more of the following may apply. A non-rounded gradient value at the intermediate 20-bit may be calculated, as illustrated by:

$$gH\_a'_{1,1} = 8 \cdot f_{0,1} - 32 \cdot e_{0,1} - 13 \cdot a_{0,1} + 50 \cdot b_{0,1} - 18 \cdot c_{0,1} + 5 \cdot d_{0,1} \quad (9)$$

The horizontal gradient may be calculated by shifting the intermediate gradient value into the output precision as:

$$gH\_a_{1,1} = \text{sign}(gH\_a'_{1,1}) \cdot ((abs(gH\_a'_{1,1}) + \text{OffSet}_1) >> (18-B)) \quad (10)$$

Referring to (10): $\text{sign}(\cdot)$ and $\text{abs}(\cdot)$ may include the functions that return the sign and the absolute value of the input signal, respectively; and $\text{OffSet}_1$ may include the rounding offset, which may be calculated as $2^{17-B}$.

Referring now to a vertical gradient derivation value at (1, 1), the intermediate vertical gradient values at fractional position (0, 1) may be derived, e.g.:

$$gV\_f_{0,1} = 8 \cdot X_{0,0} - 32 \cdot L_{0,0} - 13 \cdot F_{0,0} + 50 \cdot R_{0,0} - 18 \cdot AD_{0,0} + 5 \cdot AJ_{0,0}$$

$$gV\_e_{0,1} = 8 \cdot W_{0,0} - 32 \cdot K_{0,0} - 13 \cdot E_{0,0} + 50 \cdot Q_{0,0} - 18 \cdot AC_{0,0} + 5 \cdot AI_{0,0}$$

$$gV\_a_{0,1} = 8 \cdot S_{0,0} - 32 \cdot G_{0,0} - 13 \cdot A_{0,0} + 50 \cdot M_{0,0} - 18 \cdot Y_{0,0} + 5 \cdot AE_{0,0}$$

$$gV\_b_{0,1} = 8 \cdot T_{0,0} - 32 \cdot H_{0,0} - 13 \cdot B_{0,0} + 50 \cdot N_{0,0} - 18 \cdot Z_{0,0} + 5 \cdot AF_{0,0}$$

$$gV\_c'_{0,1}=8 \cdot U_{0,0}-32 \cdot I_{0,0}-13 \cdot C_{0,0}+50 \cdot O_{0,0}-18 \cdot AA_{0,0}+ 5 \cdot AG_{0,0}$$

$$gV\_d'_{0,1}=8 \cdot V_{0,0}-32 \cdot J_{0,0}-13 \cdot D_{0,0}+50 \cdot P-18 \cdot AB_{0,0}+ 5 \cdot AH_{0,0} \quad (11)$$

The intermediate gradient values may be adjusted by shifting to 14-bit values as:

$$gV\_f_{0,1}=\text{sign}(gV\_f'_{0,1}) \cdot ((abs(gV\_f'_{0,1})+ \text{OffSet}_0) \gg (B-8))$$

$$gV\_e_{0,1}=\text{sign}(gV\_e'_{0,1}) \cdot ((abs(gV\_e'_{0,1})+ \text{OffSet}_0) \gg (B-8))$$

$$gV\_a_{0,1}=\text{sign}(gV\_a'_{0,1}) \cdot ((abs(gV\_a'_{0,1})+ \text{OffSet}_0) \gg (B-8))$$

$$gV\_b_{0,1}=\text{sign}(gV\_b'_{0,1}) \cdot ((abs(gV\_b'_{0,1})+ \text{OffSet}_0) \gg (B-8))$$

$$gV\_c_{0,1}=\text{sign}(gV\_c'_{0,1}) \cdot ((abs(gV\_c'_{0,1})+ \text{OffSet}_0) \gg (B-8))$$

$$g\_d_{0,1}=\text{sign}(g\_d'_{0,1}) \cdot ((abs(g\_d'_{0,1})+\text{OffSet}_0) \gg (B-8)) \quad (12)$$

The vertical gradient value at fractional position (1, 1) may be obtained by applying an interpolation filter $h_L$ on top of the intermediate gradient values at fractional position (0, 1). One or more of the following may apply. A non-rounded gradient value at 20-bit may be calculated and the non-rounded gradient value may be adjusted to the output bit-depth through a shifting operation, as shown by:

$$gV\_a'_{1,1}=gV\_f_{0,1}-3 \cdot gV\_e_{0,1}+64 \cdot gV\_a_{0,1}+ 4 \cdot gV\_b_{0,1}-2 \cdot gV\_c_{0,1} \quad (13)$$

$$gV\_a_{1,1}=\text{sign}(gV\_a'_{1,1}) \cdot ((abs(gV\_a'_{1,1})+ \text{OffSet}_1) \gg (18-B)) \quad (14)$$

Figure 6B:
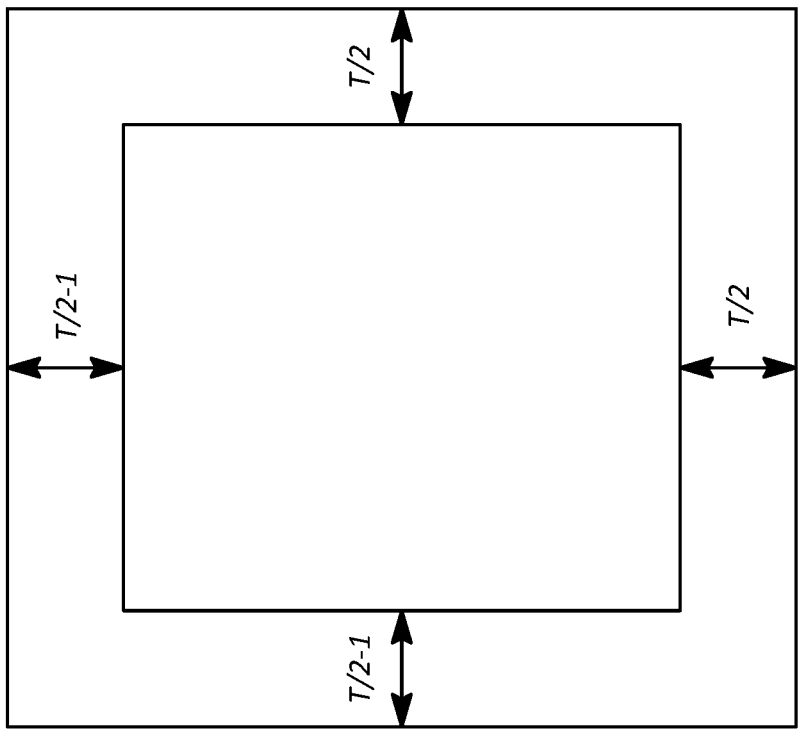
FIG. 6B shows an example of the memory access of BDOF with a block extension constraint.
Figure 6A:
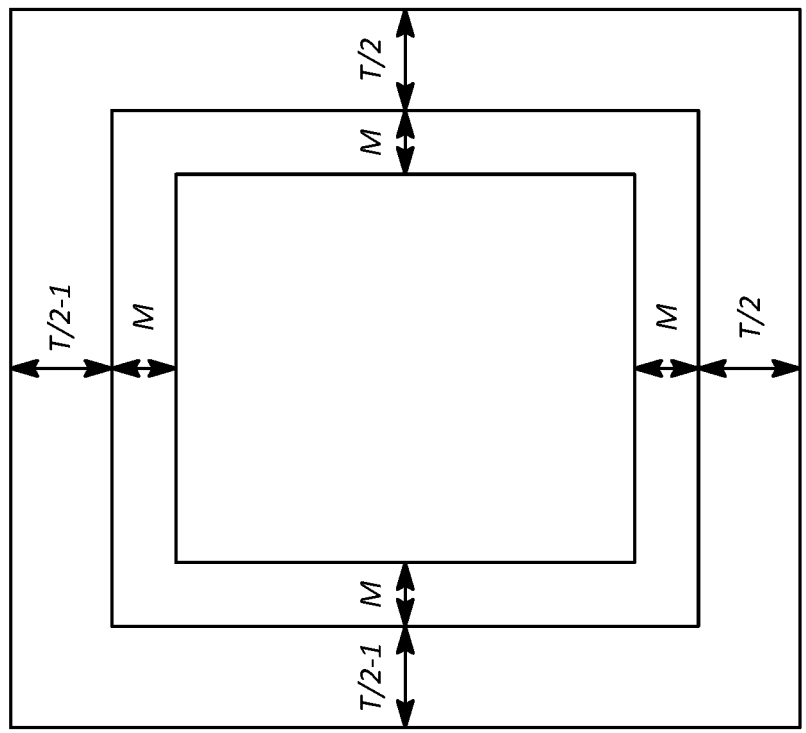
FIG. 6A shows an example of the memory access of BDOF without a block extension constraint

Memory bandwidth consumption of the BDOF may be provided. As shown in (5), to derive the local motion refinement ($v_x$, $v_y$) at a position, the sample values and the gradient values may be calculated for one or more samples (e.g. all samples) in a window $\Omega$ surrounding the sample. The window size may include $(2M+1) \times (2M+1)$, where M=2. Due to the interpolation filter and the gradient filter, the gradient derivation may access one or more (e.g., additional) reference samples, which may be found in an extended area of the current block. The length T of the interpolation filter and the gradient filter may be 6, and/or a corresponding extended block size may be equal to T−1=5. For example, considering a W×H block, the memory access (e.g. total memory access) used by the BDOF may be $(W+T-1+2M) \times (H+T-1+2M)=(W+9) \times (H+9)$, which may be larger than the memory access $(W+7) \times (H+7)$ that is used by other techniques. The memory access of the BDOF may not be larger than that of other techniques. A block extension constraint may be provided. When a block extension constraint is applied, the neighboring samples within the current block may be used for calculating the local motion refinement ($v_x$, $v_y$) at a position (e.g. each position inside the block). FIGS. 6A-B shows a diagram of memory access of the BDOF, where FIG. 6A shows memory access without a block extension constraint, and where FIG. 6B shows memory access with a block extension constraint. FIGS. 6A and 6B may compare the size of the memory access region for the BDOF before and after the block extension constraint is applied.

Sub-block (e.g., sub-CU) based motion compensation may be performed. A coding block may have a motion vector for a prediction direction. A number of sub-block-level inter prediction techniques may be used. The sub-block-level inter prediction techniques may include advanced temporal motion vector prediction (ATMVP), spatial-temporal motion vector prediction (STMVP), frame-rate up conversion (FRUC) mode, affine mode, and/or the like. One or more of the following may apply. A video block may be split into multiple small sub-blocks and may be used to derive the motion information for the sub-blocks (e.g., each sub-block separately). The motion information for the sub-blocks may be used to generate the prediction signal of a block, for example, at the motion compensation stage. Sub-block coding modes may be provided.

Figure 7:
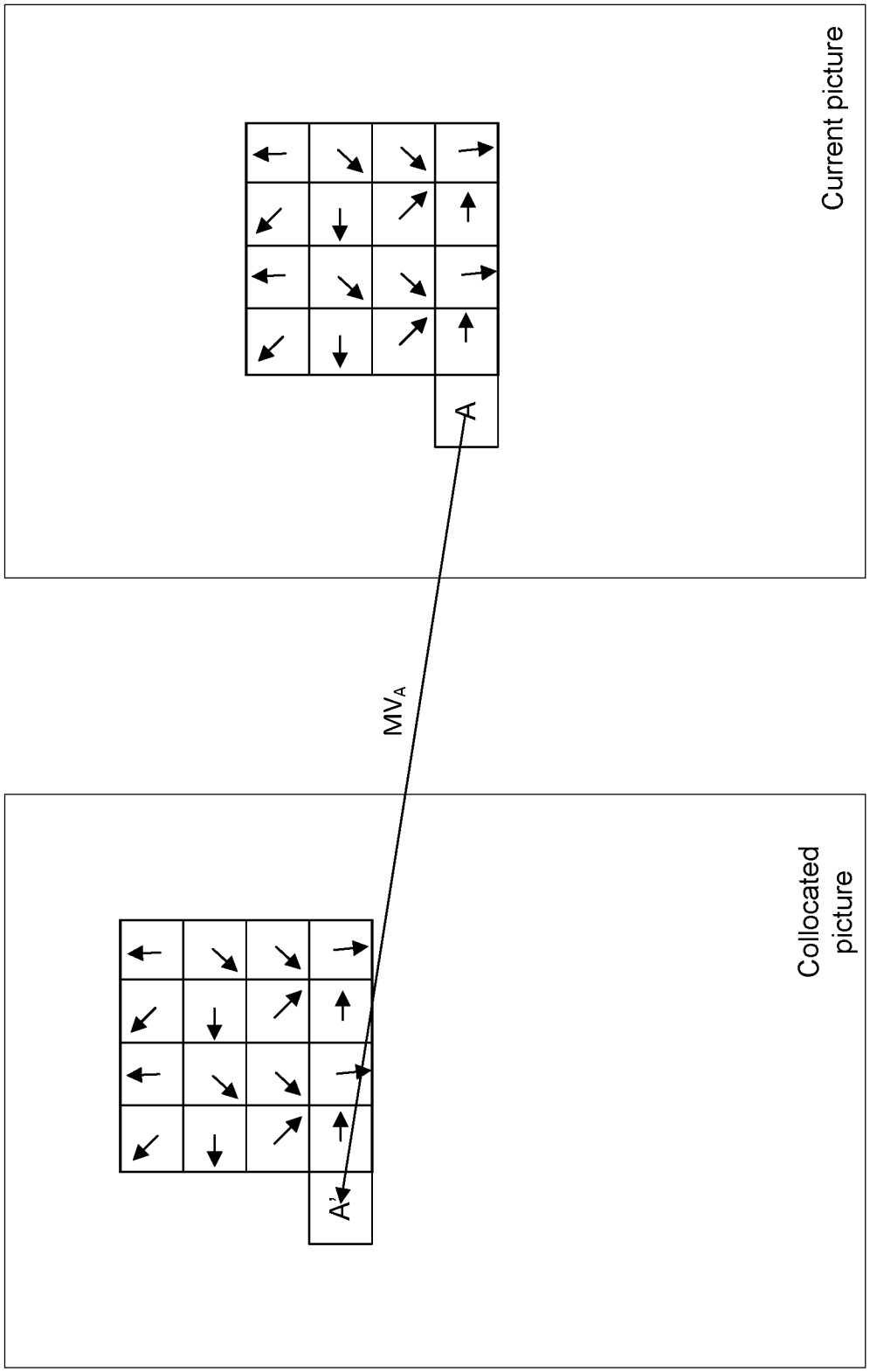
FIG. 7 shows an example of advanced temporal motion vector prediction (ATMVP).

As described herein, ATMVP may be performed. One or more of the following may apply. Temporal motion vector prediction may provide for a block to derive motion information. The derived motion information may include motion vector and reference indices for the sub-blocks within a block (e.g., from one or more smaller blocks of the temporally neighboring pictures of a current picture). The ATMVP may derive the motion information of sub-blocks of a block: a corresponding block of the current block, which may be called a collocated block, may be identified (e.g., within a temporal reference picture); the current block may be split into sub-blocks; and/or the motion information of the sub-blocks from the corresponding small block in the collocated picture may be derived, as shown in FIG. 7. The selected temporal reference picture may be called the collocated picture.

FIG. 7 shows an example diagram of ATMVP. The collocated block and the collocated picture may be identified, for example, by the motion information of the spatial neighboring blocks of the current block. As illustrated in FIG. 7, an available candidate (e.g. the first available candidate) in the merge candidate list may be considered. For example, referring to FIG. 7, block A may be identified as an available (e.g., the first available) merge candidate of the current block based on the existing scanning order of a merge candidate list. The corresponding motion vector of block A (e.g., $MV_A$) and its reference index may be used to identify the collocated picture and the collocated block. The location of the collocated block in the collocated picture may be determined by adding the motion vector of block A ($MV_A$) to the coordinate of the current block.

For a sub-block (e.g. each sub-block) in the current block, the motion information of its corresponding small block (e.g., as indicated by the arrows in FIG. 7) in the collocated block may be used to derive the motion information of the corresponding sub-block in the current block. For example, the motion information of the small blocks in a collocated block may be converted to the motion vector and reference index of the corresponding sub-block in the current block (e.g. after the motion information of each small block in a collocated block is identified). The motion information of the sub-blocks in a current block be may derived in a manner similar to other derivation techniques (e.g., where temporal motion vector scaling may be applied).

Figure 8:
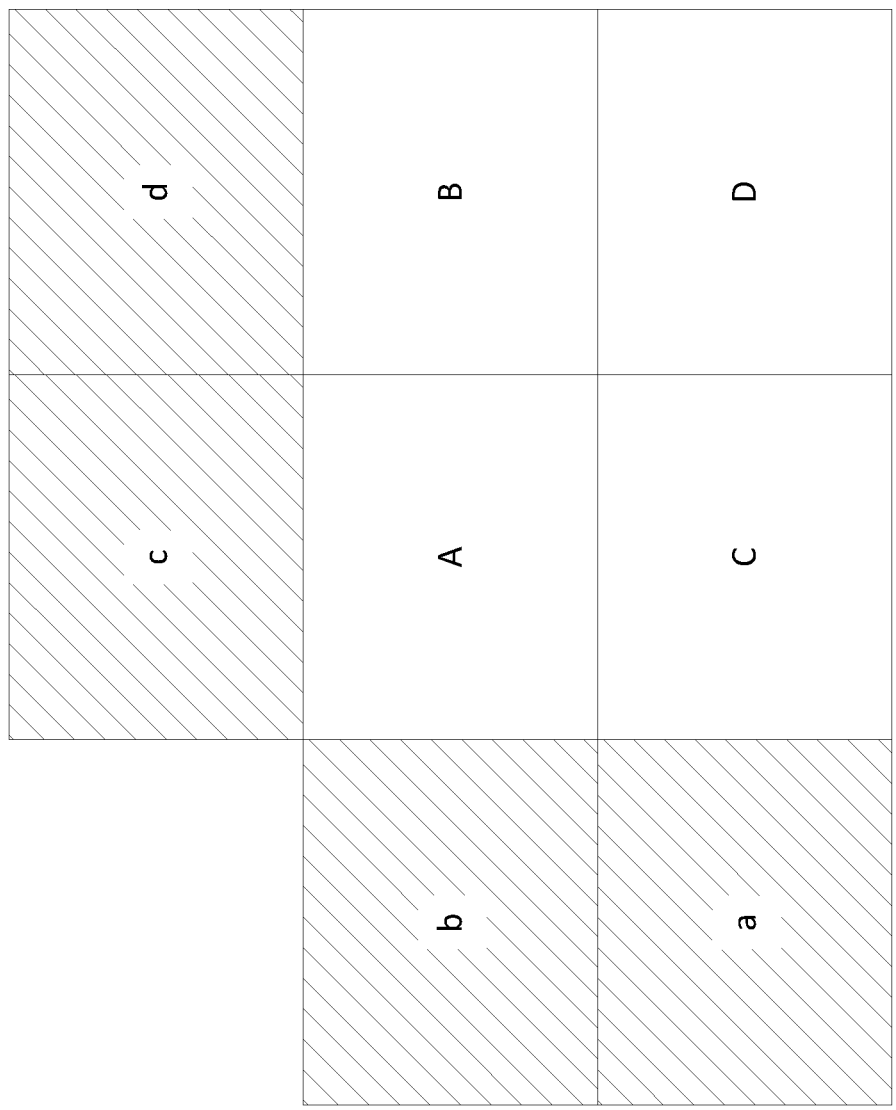
FIG. 8 shows an example of spatial-temporal motion vector prediction (STMVP).

As described herein, STMVP may be performed. FIG. 8 shows an exemplary diagram of STMVP. One or more of the following may apply. In STMVP, the motion information of the sub-blocks in a coding block may be derived (e.g., recursively derived). FIG. 8 illustrates an example of recursively deriving the motion information of the sub-blocks in a coding block. Referring to FIG. 8, a current block may include four sub-blocks A, B, C and D. The neighboring small blocks that may be spatial neighbors to the current block may be labeled as a, b, c and d, respectively. The motion derivation for sub-block A may include identifying one or more spatial neighbors (e.g., the two spatial neighbors of sub-block A). A neighbor (e.g. a first neighbor) of sub-block A may be the above neighbor c. If the small block c is not available or is intra coded, the following neighboring small blocks above the current block may be checked in an order (e.g. from left to right). Another neighbor (e.g. a second neighbor) of sub-block A may be the left neighbor b. If the small block b is not available or intra coded, the following neighboring small blocks may be checked in an order, for example, to the left of the current block (from top to bottom). After fetching the motion information of spatial neighbors, the motion information of a temporal neighbor of sub-block A may be obtained using a procedure that may be similar to TMVP. The motion information of the available spatial neighbors and one or more temporal neighbors (e.g. up to 3 neighbors) may be averaged and used as the motion information of sub-block A. Based on the raster scan order, the above STMVP process may be repeated to derive the motion information of the other sub-blocks (e.g. all the other sub-block) in the current video block.

Frame-rate up conversion (FRUC) may be performed. FRUC may be supported for inter coded blocks, which may reduce motion information signaling. When FRUC mode is enabled, the motion information of a coded block, which may include motion vectors and reference indices, may not be signaled. The motion information may be derived (e.g., at the decoder) using, for example, template-matching and/or bilateral-matching. For example, during a motion derivation process at a decoder, the merge candidate list of the block and a set of preliminary motion vectors generated from the motion vectors of the temporal collocated blocks of the current block may be checked. The candidate that leads to a minimum sum of absolute difference (SAD) may be selected as the starting point. A local search based on template-matching or bilateral-matching around the starting point may be performed. The MV that results in the minimum SAD may be used as the MV for the block. The motion information may be refined at the sub-block level, which may provide for efficient motion compensation.

Figure 9A:
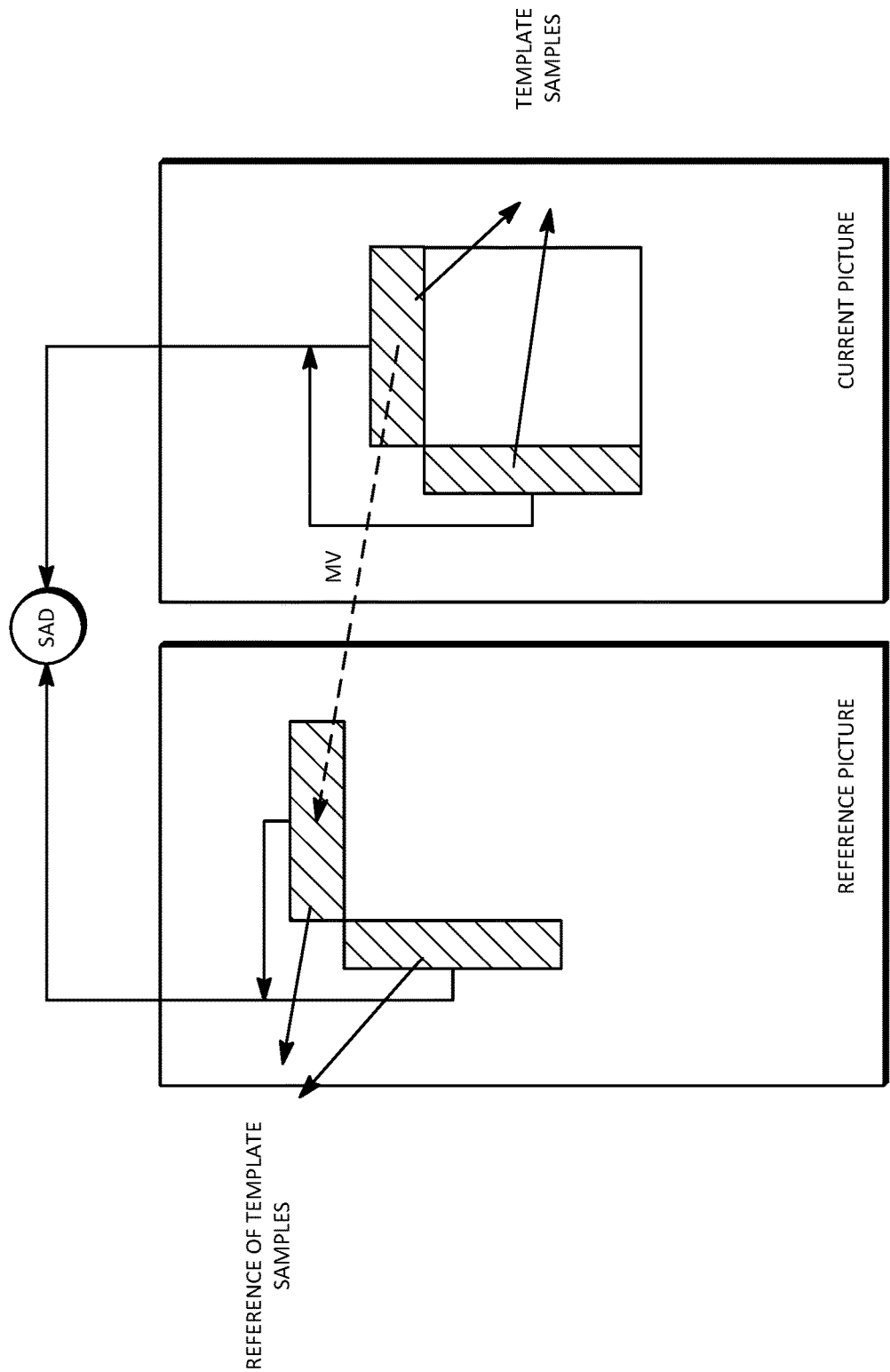
FIG. 9A shows an example of frame-rate up conversion (FRUC) with template-matching.
Figure 9B:
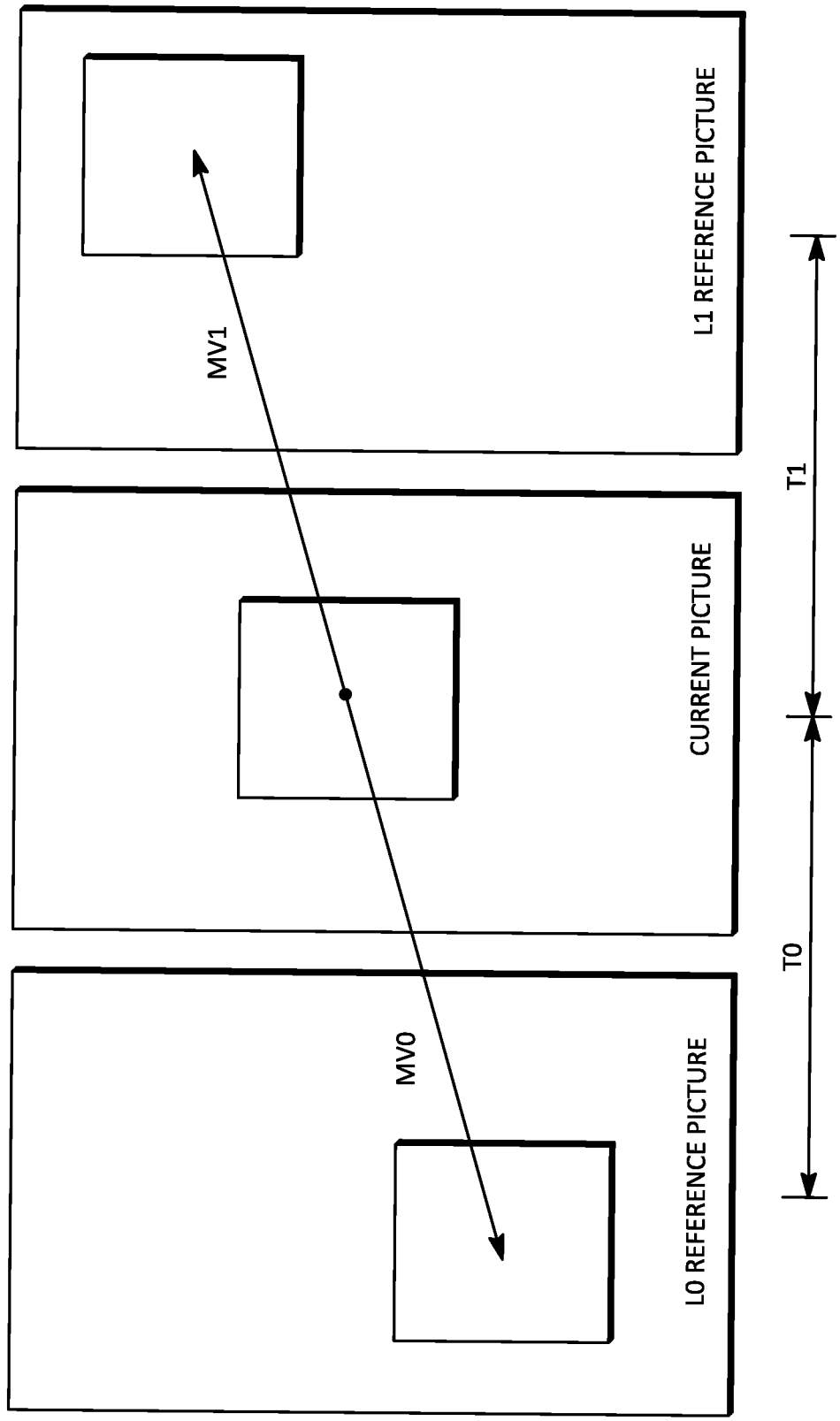
FIG. 9B shows a diagram of FRUC with bilateral-matching.

FIGS. 9A and 9B illustrate examples associated with FRUC. For example, FIG. 9A-B show exemplary diagrams for frame-rate up conversion, where FIG. 9A shows template-matching, and FIG. 9B shows bilateral-matching. As shown in FIG. 9A, template-matching may be used to derive motion information of the current block by finding a match (e.g. the best match) between a template in the current picture and a block (e.g., which may be the same size as the template) in a reference picture. The template may include the top and/or left neighboring blocks of the current block. In FIG. 9B, the bilateral-matching may be used to derive the motion information of a current block. The derivation of the motion information of a current block may include finding a match (e.g. the best match) between two blocks along the motion trajectory of the current block in different reference pictures (e.g., two different reference pictures). The motion search process of bilateral-matching may be based on the motion trajectory. For example, the motion search process of bilateral-matching may be based on the motion vectors $MV_0$ and $MV_1$. The motion vectors $MV_0$ and $MV_1$ may point to the reference blocks. The motion vectors $MV_0$ and $MV_1$ may be proportional to the temporal distances between the current picture and the two reference pictures (e.g., $T_0$ and $T_1$).

Figure 10B:
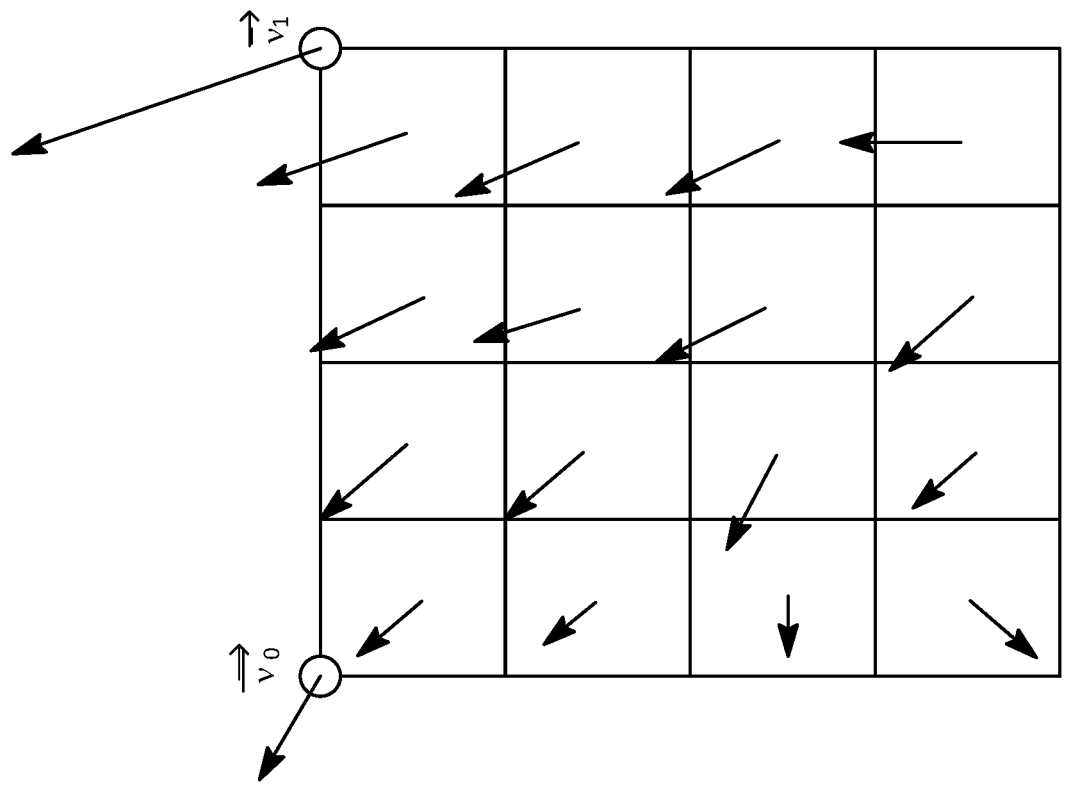
FIG. 10B shows a diagram of affine mode and sub-block-level motion derivation for affine blocks.
Figure 10A:
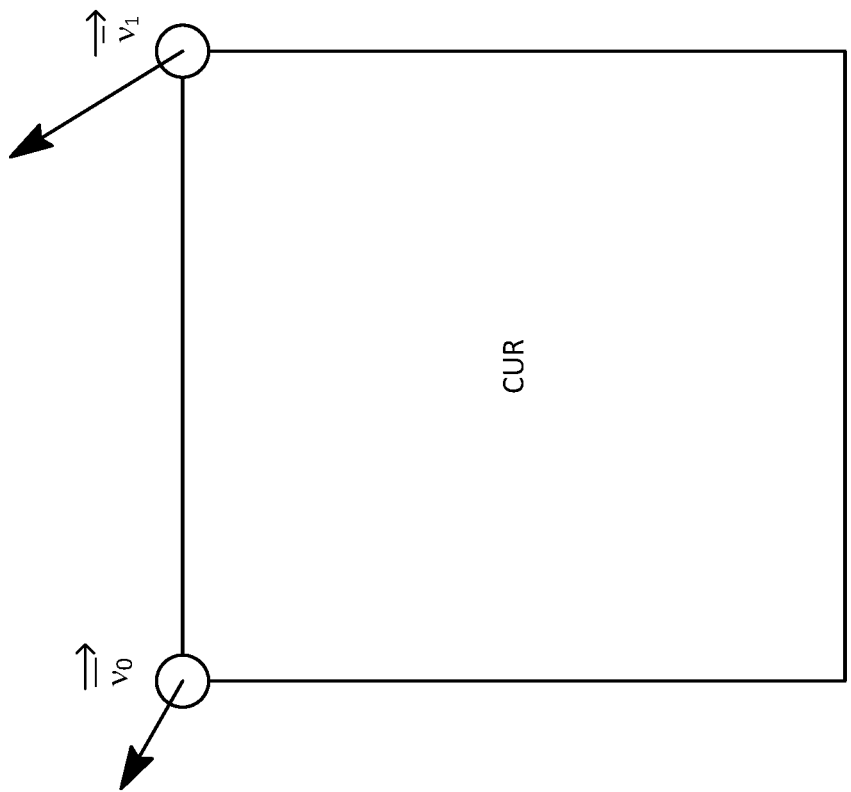
FIG. 10A shows a diagram of affine mode and a simplified affine model.

An affine model may be used to provide motion information. FIGS. 10A and 10B show example diagrams for affine mode, where FIG. 10A shows a simplified affine model, and FIG. 10B shows a sub-block-level motion derivation for affine blocks. A translation motion model may be applied for motion compensation prediction. Motion may include one or more of the following: zoom in/out, rotation, perspective motions, irregular motions, and/or the like. An example affine transform motion compensation prediction may be applied. As shown in FIG. 10A, the affine motion field of the block may be described by one or more (e.g., two) control point motion vectors. Based on the control point motion, the motion field of an affine block may be described as:

$$v_x = \frac{(v_{1x} - v_{0x})}{w}x - \frac{(v_{1y} - v_{0y})}{w}y + v_{0x} \qquad (15)$$
$$v_y = \frac{(v_{1y} - v_{0y})}{w}x + \frac{(v_{1x} - v_{0x})}{w}y + v_{0y}$$

Referring to (15), $(v_{0x}, v_{0y})$ may be the motion vector of the top-left corner control point, and $(v_{1x}, v_{1y})$ may be a motion vector of the top-right corner control point, as shown in FIG. 10A. When a video block is coded by affine mode, the motion field of the video block may be derived based on the granularity of 4×4 block. For example, as shown in FIG. 10B, to derive the motion vector of a 4×4 block (e.g. each 4×4), the motion vector of the center sample of a sub-block (e.g. each sub-block) may be calculated according to (15), and may be rounded to $\frac{1}{16}$-pel accuracy. The derived motion vectors may be used at the motion compensation stage to generate the prediction signal of the sub-blocks inside the current block.

BDOF may be simplified. One or more of the following may apply. The number of BDOF process for bi-predicted CUs may be reduced. BDOF may be performed in consideration of parallel processing. For the bi-predicted CUs, the BDOF process may be skipped at either CU level or sub-CU level based on the similarity of two prediction signals from one or more (e.g. two) reference lists. For example, if the prediction signals are similar, BDOF adjustments may be skipped. The number of BDOF adjustments invoked may be reduced, for example, such that the coding performance is maintained. The gradient derivation of BDOF for a list (e.g. each list) may include a sample interpolation and a gradient calculation if the motion vector in the list is not an integer. The order of horizontal and vertical filtering may be changed for implementation with parallel processing.

As described herein, an integer motion component may be provided. For example, if k bits are used as a representation of the fractional part of a motion vector component, and a component value of a motion vector is a multiple of ($2^k$), the motion vector component may include an integer motion vector component. Similarly, if a component value of a motion vector is not a multiple of ($2^k$), the motion vector component may include a non-integer (e.g., fractional) part and an integer part.

As described herein, BDOF may be performed in consideration of bi-predictive prediction. The granularity and the accuracy of the motion vectors that are used at the motion compensation stage may be improved.

In BDOF, the horizontal gradients and vertical gradients may be generated for the reference picture lists (e.g., L0 and L1). For example, BDOF refinement may include the invocation of one or more filtering processes (e.g., horizontal and/or vertical filtering processes) on the horizontal and vertical gradients within the reference picture lists (e.g. each reference picture list list). As discussed herein, given a motion vector, $MV(MV_x, MV_y)$, horizontal gradient derivation may include applying a sample interpolation filter in the vertical direction. For example, if $MV_y$ (e.g., the vertical component of the motion vector MV) includes a non-integer (e.g., fractional) motion vector component, the sample interpolation filter may be used to derive the sample values at the fractional positions. Gradient filtering may be performed in the horizontal direction using the sample values interpolated at fractional positions vertically. If $MV_y$ includes an integer motion component, a gradient filter (e.g. a single gradient filter) may be applied in the horizontal direction, for example, using the sample values at integer positions. A similar process may be performed for the derivation of vertical gradients.

A bi-prediction CU may be associated with one or more (e.g., two) motion vectors. One or more filtering processes may be performed on the CU. For example, if the horizontal and vertical components of the motion vectors associated with a CU include non-integer (e.g., fractional) motion components, a plurality of (e.g., 8) filtering processes may be performed. A filtering process, when performed (e.g., invoked), may include memory access requests, multiple multiplications, and multiple additions. The length of the filters used during BDOF (e.g. an 8 tap sample interpolation filter and a 6 tap gradient filter) may affect coding complexity.

BDOF refinement may be conditionally skipped. For example, BDOF refinement may be conditionally skipped based on the similarity between two or more prediction signals. One or more other similarity determinations may be performed to determine whether to skip BDOF.

BDOF refinement of a CU (e.g., as described in Equation (2)), may include motion refinement in the horizontal and vertical directions. A motion refinement parameter ($v_x$, $v_y$) may be derived. For example, the motion refinement parameter ($v_x$, $v_y$) may be derived with a least-square technique using predictions. Local gradient information, for example, from two or more reference pictures, may be used for bi-prediction. A motion refinement parameter may be derived.

A simplified gradient derivation method may be used for BDOF. As described herein, BDOF may include eight filtering processes if the horizontal and vertical components of the motion vectors associated with a CU include non-integer (e.g., fractional) motion components. The number of filtering processes may be reduced, for example, to four filtering processes. The number of memory access, multiplications, and/or additions may be reduced.

A determination of whether to perform BDOF refinement may be made, for example, before BDOF refinement is performed. The determination of whether to skip BDOF may be based on one or more characteristics associated with a CU (e.g., coding mode and/or block size).

Directional BDOF refinement may be performed on a CU. For example, directional BDOF refinement may include performing BDOF refinement in a certain direction (e.g., a vertical direction or a horizontal direction). A gradient based analysis (e.g., gradient calculation) may be performed, for example, for bi-predicted CUs. As described herein, the gradient calculation may be performed at one or more levels, for example, including: the CU level, the sub-CU level, the block level, the sub-block level, etc. Based on the gradient calculation, one or more of the following may apply: BDOF refinement may be skipped, directional BDOF refinement may be performed in the horizontal direction, directional BDOF refinement may be performed in the vertical direction, and BDOF refinement may be performed in the horizontal and vertical directions.

As described herein, BDOF refinement may include the performance of a gradient calculation. A gradient calculation process may include the derivation of the horizontal direction and/or the vertical direction gradients for the reference pictures of a CU, for example, using the motion vectors associated with that reference picture. The motion vectors associated with the reference pictures may include a motion component. The gradient calculation in a certain direction may include the application of a sample interpolation filter, if, for example, the motion vector component in another direction (e.g., a perpendicular direction) is a non-integer (e.g., fractional) motion component. A gradient filter may be applied, for example, following the sample interpolation filter. The sample interpolation filter may include a low pass filter, and the gradient filter may include a high pass filter, which may be used for the gradient derivation.

A gradient may be calculated using the sample value(s) at an integer position. The sample value at the integer position of a reference CU may be identified. The sample value at the integer position may be used to approximate the sample value at a fractional position, for example, if the motion vector component in that direction includes a non-integer (e.g., fractional) motion component. The gradient calculation may include the application of a gradient filter in a certain direction. A sample interpolation filter may not be applied. A motion vector may be referenced as MV ($MV_x$, $MV_y$) and may be associated with a reference picture R. k may be the number of bits represented for the fractional value of a motion vector component. The number of gradient filters defined for the fractional positions may be denoted as n (e.g. 16 as illustrated in Table 1). n may not be greater than ($2^k$). The position of a CU (e.g., the current bi-prediction CU in a current picture) may be denoted as P($P_x$, $P_y$).

The horizontal gradients of the CU associated with the motion vector MV (e.g., reference CU) may be derived. One or more of the following may apply. The integer position of the reference CU may be identified in a reference picture associated with the CU. The integer position of the reference CU may include P'(P'x, P'y), where P'x=Px+(MVx>>k) and P'y=Py+($MV_y$>>k). The phase of the gradient filter (e.g., horizontal fractional position) may be identified (e.g., Phase=(($MV_x$)&($2^k$−1))/($2^k$/n)). The gradient filter, which may be defined in Table 1, may be identified with the phase. To calculate the horizontal gradient, the gradient filter may be applied (e.g., in the horizontal direction) to the sample positions in the reference CU located at P'(P'x, P'y) in the reference picture R.

The vertical gradients of a CU associated with the motion vector MV (e.g., a reference CU) may be derived. One or more of the following may apply. The integer position of the reference CU may be identified in a reference picture associated with the CU. The integer position of the reference CU may include P'(P'x, P'y), where P'x=Px+(MVx>>k) and P'y=Py+(MVy>>k). The phase of the gradient filter (e.g., vertical fractional position) may be identified (e.g., Phase= ((MVy)&($2^k$−1))/($2^k$/n)). The gradient filter, which may be defined in Table 1, may be identified with the phase. To calculate the vertical gradient, the gradient filter may be applied (e.g., in the vertical direction) to sample positions within the reference CU located at P'(P'x, P'y) in the reference picture R.

The techniques described herein may be applied to derive other sets of horizontal and vertical gradients (e.g., derive the sets of horizontal and vertical gradients from the reference picture lists L0 and/or L1). For example, the techniques describe herein may be applied to other motion vectors (e.g. the second motion vector) associated with a bi-prediction CU to derive other sets of horizontal and vertical gradients. If the motion vectors associated with a CU (e.g., the two motion vectors associated a bi-prediction CU) include a non-integer (e.g., fractional) motion component, the number of filters applied to a sample during BDOF may be decreased (e.g., 4 gradient filters may be applied to each sample).

As described herein, a sample interpolation filter may be skipped, for example, during a gradient derivation. Gradient filters may be applied during gradient derivation (e.g. one of the 16 filters defined in Table 1), for example, to the integer position associated with a reference CU. As described herein, applying a gradient filter to the reference samples at the integer position of the reference CU may approximate the fractional position of a sample in the reference CU (e.g., if the motion vector includes a non-integer motion component). The filter that is to be used for a CU (e.g. each CU) may be identified based on a motion vector associated with the CU. The number of gradient filters applied during a gradient derivation (e.g., n) may be reduced. The number of gradient filters may be smaller than the number of possible fractional positions of a motion vector component. For example, a single gradient filter may be used during gradient derivation. The gradient filter may be defined (e.g., pre-defined), such as, the gradient filter defined at position 0 in Table 1. If a single gradient filter is used during gradient derivation, the gradient filter may not be stored and a phase for the gradient filter may not be calculated.

BDOF process may be conditionally performed based on one or more characteristics associated with a CU (e.g., coding mode and/or size). For example, BDOF may or may not be performed based on one or more characteristics associated with a CU (e.g., coding mode and/or size). A CU may be associated with one or more inter coding modes. For example, certain coding modes may support sub-CU (e.g., or sub-block) prediction, such as: ATMVP/STMVP, FRUC bilateral, FRUC template matching, affine, etc. A sub-CU (e.g., a sub-block within a CU) with individual motion information may be referred as a PU. A sub-CU may be used in BDOF, for example, to improve inter prediction efficiency. For example, a sub-CU may provide a motion field (e.g., a fine motion field) for the sub-CU. The inter coding modes that support sub-CU prediction may have different characteristics, respectively. One or more of the following may apply. ATMVP/STMVP may derive the motion field of a current CU from spatially neighboring blocks, temporally neighboring blocks, and/or spatially and temporally neighboring blocks. FRUC bilateral and template matching may derive the motion information in a manner similar to a motion search. For example, FRUC bilateral and template matching may derive the motion information at the decoder.

BDOF (e.g., BDOF refinement) may be conditionally performed based on the coding mode associated with a CU. For example, BDOF may be skipped based the inter coding mode associated with a CU (e.g., sub-CU and/or PU). The inter coding mode associated with a CU may be identified. The inter coding mode may support sub-CU prediction. If the inter coding mode associated with a CU supports sub-CU prediction, BDOF refinement may be skipped (e.g., disabled for the CU).

As described herein, BDOF may or may not be performed based on the size associated with a CU (e.g., a sub-CU and/or a PU). For the sub-CU inter modes, if the PU size is larger (e.g., larger than a threshold, such as 32×32), the coding region may be in certain motion area (e.g., smooth motion area). If the PU size is smaller (e.g., smaller than a threshold, such as 32×64), the motion in the coding region may be complex. If a CU (e.g., the current bi-prediction CU) is coded using the sub-block inter modes and the PU size is large (e.g. greater than a threshold, which may be pre-defined), the BDOF process (e.g., BDOF refinement) may be skipped. If the PU size is small (e.g. no greater than a threshold, which may be pre-defined), the BDOF process may be applied. The threshold for a sub-CU mode (e.g. each sub-CU mode) may be signaled in the sequence parameter set, picture parameter set, the slice header, or the like.

The coding mode and/or the PU size may be identified, for example, to determine whether to perform BDOF. The similarity between two or more prediction signals, such as a SAD calculation, may not be determined. The techniques described herein, for example, with respect to determining whether to perform BDOF (e.g., based on coding mode and/or PU size) may be combined with other signal characteristic based methods. For example, techniques may include determining whether a BDOF process is requested for a current CU. A device may determine whether to perform BDOF (e.g., using one or more of the techniques described herein). For example, BDOF may be conditionally performed based on the PU size and/or the coding mode.

Figure 11:
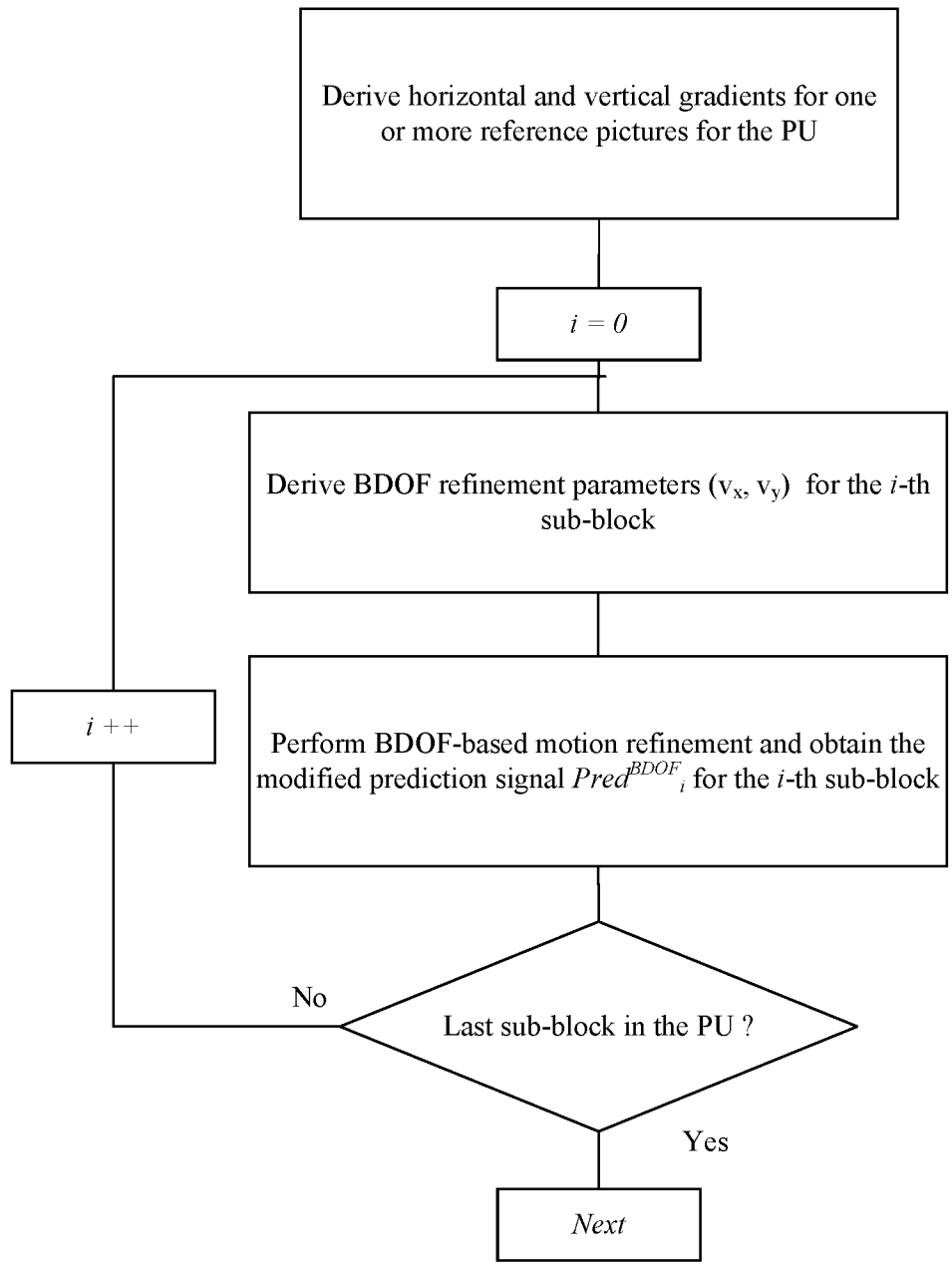
FIG. 11 shows a diagram of BDOF refinement for a prediction unit (PU).

Directional BDOF refinement may be performed. For example, BDOF refinement may be performed in a certain direction (e.g., horizontal direction or vertical direction) based on a gradient difference calculation. BDOF refinement may be performed for: a sample (e.g. each sample), a block, a CU, and/or sub-CU (e.g. a sub-block, such as 4×4). FIG. 11 shows a diagram for BDOF refinement for a CU. Horizontal gradients and vertical gradients may be calculated for a CU, for example, using the techniques described herein. One or more BDOF refinement parameters ($v_x$, $v_y$) may be derived for a sub-CU using, for example, a least square method. A BDOF refined prediction may be generated for the sub-CU, for example, using the derived BDOF refinement parameters by applying Equation (2). The characteristics of the sub-CUs may be different. If the horizontal gradient of the reference picture in list 0

$$\left(e.g., \frac{\partial I^{(0)}(x, y)}{\partial x}\right)$$

is similar to the horizontal gradient of the reference picture in list 1

$$\left(e.g., \frac{\partial I^{(1)}(x, y)}{\partial x}\right),$$

BDOF refinement may not provide for an improvement in the horizontal direction). BDOF refinement may or may not be performed in one or more directions.

A determination of whether to perform BDOF (e.g., directional BDOF) may be based on a gradient analysis (e.g., a gradient difference) that is performed in multiple (e.g., two) directions. For example, dGx (e.g., a horizontal direction gradient difference) and dGy (e.g., a vertical direction gradient difference) may be defined for a CU (e.g., or sub-CU) using Equations (16) and (17), respectively. dGx and dGy may be used to determine whether the gradient in the reference pictures associated with a CU (e.g., or sub-CU) are similar and/or to determine the direction in which to perform directional BDOF (e.g., horizontal or vertical).

$$dGx(SB) = \sum_{(x,y) \in SB} \left| \tau_1 \frac{\partial I^{(1)}(x, y)}{\partial x} - \tau_0 \frac{\partial I^{(0)}(x, y)}{\partial x} \right| \quad (16)$$

$$dGy(SB) = \sum_{(x,y) \in SB} \left| \tau_1 \frac{\partial I^{(1)}(x,y)}{\partial y} - \tau_0 \frac{\partial I^{(0)}(x,y)}{\partial y} \right| \quad (17)$$

dGx and dGy may be compared (e.g., may each be compared) to a threshold, for example, to determine whether to perform directional BDOF. The threshold may be static and/or variable. If dGx is less than or equal to a threshold, such as a static threshold (e.g., a pre-defined threshold), the horizontal gradients of a CU (e.g., or sub-CU) in the reference pictures associated with the CU may be similar. If dGy is less than or equal to a threshold, such as a static threshold (e.g., a pre-defined threshold), the vertical gradients of a CU (e.g., or sub-CU) in the reference pictures associated with a CU may be similar. One or more of the following may apply. If the gradients in the horizontal and vertical directions are similar, BDOF refinement may be skipped for the CU (e.g., or sub-CU). Bi-prediction may be applied, for example, to generate the prediction for the CU. If the vertical gradients are similar and the horizontal gradients are not similar, the horizontal BDOF refinement parameter $v_x$ may be derived and directional BDOF may be performed in the horizontal direction, for example, using Equation (18). If the vertical gradients are similar and the horizontal gradients are not similar, derivation of the vertical BDOF refinement parameter $v_y$ may be skipped.

$$pred_{BDOF}(x,y) = \frac{1}{2} \cdot \left[ \begin{array}{c} I^{(0)}(x,y) + I^{(1)}(x,y) + \\ \frac{v_x}{2}\left(\tau_1 \frac{\partial I^{(1)}(x,y)}{\partial x} - \tau_0 \frac{\partial I^{(0)}(x,y)}{\partial x}\right) \end{array} \right] \quad (18)$$

The vertical gradients may not be similar, and the horizontal gradients may be similar. The vertical BDOF refinement parameter $v_y$ may be derived and directional BDOF refinement may be performed in the vertical direction, for example, using Equation (19). The derivation of the horizontal BDOF refinement parameter $v_x$ may be skipped.

$$pred_{BDOF}(x,y) = \frac{1}{2} \cdot \left[ \begin{array}{c} I^{(0)}(x,y) + I^{(1)}(x,y) + \\ \frac{v_y}{2}\left(\tau_1 \frac{\partial I^{(1)}(x,y)}{\partial x} - \tau_0 \frac{\partial I^{(0)}(x,y)}{\partial x}\right) \end{array} \right] \quad (19)$$

The gradients in the vertical and horizontal directions may not be similar. If the gradients in the vertical and horizontal directions are not similar, BDOF refinement may be performed, for example, in the horizontal direction and the vertical direction.

As described herein, dGx and dGy may be compared (e.g., may each be compared) to a variable threshold (e.g., dynamic threshold), for example, to determine whether to perform directional BDOF. For example, dGx may be compared to a first threshold and dGy may be compared to a second threshold. The first and the second thresholds may be variable. For example, the first threshold may be dGy (e.g., the horizontal direction gradient difference) and the second threshold may be dGx (e.g., the vertical direction gradient difference). If dGx is greater than the first threshold, directional BDOF may be performed in the vertical direction. If dGy is greater than the second threshold, directional BDOF may be performed in the horizontal direction.

Figure 12:
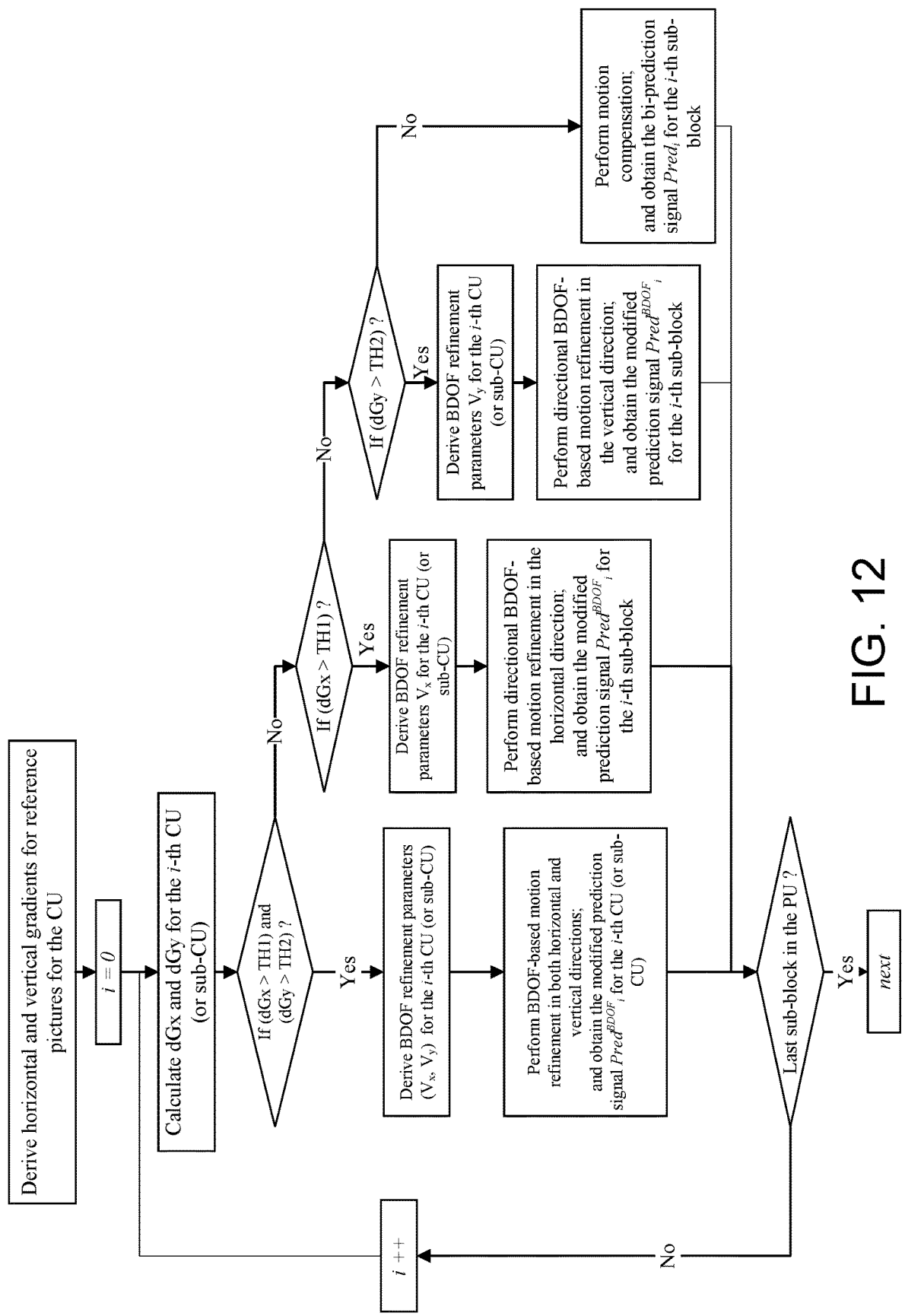
FIG. 12 shows a diagram of directional BDOF refinement.

FIG. 12 shows a diagram for directional BDOF refinement, which may be for a CU (e.g., or sub-CU). The gradients differences (e.g., dGx and dGy) may be calculated for the CU or sub-CU (e.g. each CU or sub-CU). One or more of the following may apply based on the gradient differences: BDOF refinement may not be performed (e.g., skipped), BDOF refinement may be performed, directional BDOF may be performed in the vertical direction, or directional BDOF may be performed in the horizontal direction. The thresholds may be signaled at a sequence parameter set, a picture parameter set, a slice header, or the like. As described herein, the thresholds may be variable (e.g., referring to FIG. 12, TH1 may include dGy and/or TH2 may include dGx).

The gradient differences may be calculated across the CU, for example, using Equations (20) and (21) (e.g., at the beginning of a PU process). The determination of the direction in which to perform directional BDOF refinement may be made at the CU, sub-CU and/or the PU level. One or more of the following may apply: BDOF refinement may be skipped at the CU, sub-CU, and/or the PU level; directional BDOF refinement may be performed in the horizontal direction at the CU, sub-CU, and/or the PU level, directional BDOF refinement may be performed in the vertical direction at the CU, sub-CU, and/or the PU level; BDOF refinement may be performed at the CU, sub-CU, and/or the PU level; etc. The threshold may be scaled, for example, based on the area of the CU, sub-CU, and/or the PU (e.g., because the dGx or dGy comparisons may not be performed for sub-blocks with equal size).

$$dGx(PU) = \sum_{(x,y) \in PU} \left| \tau_1 \frac{\partial I^{(1)}(x,y)}{\partial x} - \tau_0 \frac{\partial I^{(0)}(x,y)}{\partial x} \right| \quad (20)$$

$$dGy(PU) = \sum_{(x,y) \in PU} \left| \tau_1 \frac{\partial I^{(1)}(x,y)}{\partial y} - \tau_0 \frac{\partial I^{(0)}(x,y)}{\partial y} \right| \quad (21)$$

What is claimed:

1. An apparatus for video decoding, comprising one or more processors, wherein the one or more processors are configured to:
obtain a size of a coding block, wherein the coding block comprises a subblock;
determine whether to enable bi-directional optical flow (BDOF) for the coding block based on a comparison between the size of the coding block and a value;
determine whether to perform BDOF for the subblock of the coding block based on the determination of whether to enable BDOF for the coding block and based on an extent of a prediction similarity associated with the subblock, wherein the one or more processors are configured to:
based on a determination to enable BDOF for the coding block, obtain a first prediction value associated with a first reference block of the subblock and a second prediction value associated with a second reference block of the subblock; and
determine the extent of the prediction similarity associated with the subblock based on the first prediction value associated with the first reference block of the subblock and the second prediction value associated with the second reference block of the subblock;
predict the subblock based on the determination of whether to perform BDOF for the subblock; and
decode the coding block based on the predicted subblock.

2. The apparatus of claim 1, wherein the one or more processors are configured to:
obtain the value based on a parameter set or a slice header; and
determine whether the size of the coding block is less than the value based on the comparison between the size of the coding block and the value, wherein the determination of whether to enable BDOF for the coding block is based on whether the size of the coding block is less than the value.

3. The apparatus of claim 1, wherein the one or more processors are configured to:
determine that BDOF is to be performed for the subblock based on the comparison between the size of the coding block and the value; and
refine a motion vector associated with the subblock of the coding block using gradients associated with a location in the subblock.

4. The apparatus of claim 1, wherein the determination of whether to perform BDOF for the subblock comprises a determination that the first prediction value and the second prediction value are similar, and the one or more processors are configured to bypass BDOF for the subblock based on the determination that the first prediction value and the second prediction value are similar.

5. The apparatus of claim 1, wherein the determination of whether to perform BDOF for the subblock comprises a determination that the first prediction value and the second prediction value are not similar, and the one or more processors are configured to perform BDOF for the subblock based on the determination that the first prediction value and the second prediction value are not similar.

6. The apparatus of claim 1, wherein the one or more processors are configured to:
determine the first prediction value based on at least one sample value of a first plurality of sample values in the first reference block of the subblock, wherein the first reference block is associated with a first reference picture list; and
determine the second prediction value based on at least one sample value of a second plurality of sample values in the second reference block of the subblock, wherein the second reference block is associated with a second reference picture list, and wherein the first reference picture list and the second reference picture list are different.

7. The apparatus of claim 6, wherein the one or more processors are configured to:
determine a sum of absolute difference (SAD) based on the first prediction value and the second prediction value, wherein the extent of the prediction similarity associated with the subblock is determined based on the SAD.

8. The apparatus of claim 1, wherein the one or more processors are configured to:
determine an inter prediction mode for the coding block, wherein the determination of whether to enable BDOF for the coding block is further based on the determined inter prediction mode, and wherein the determined inter prediction mode for the coding block is an advanced temporal motion vector prediction (ATMVP) mode, a spatial-temporal motion vector prediction (STMVP) mode, a frame-rate up conversion (FRUC) mode, or an affine mode.

9. A method for video decoding, comprising:
obtaining a size of a coding block, wherein the coding block comprises a subblock;
determining whether to enable bi-directional optical flow (BDOF) for the coding block based on a comparison between the size of the coding block and a value;
determining whether to perform BDOF for the subblock of the coding block based on the determination of whether to enable BDOF for the coding block and based on an extent of a prediction similarity associated with the subblock, wherein the method further comprises:
based on a determination to enable BDOF for the coding block, obtaining a first prediction value associated with a first reference block of the subblock and a second prediction value associated with a second reference block of the subblock; and
determining the extent of the prediction similarity associated with the subblock based on the first prediction value associated with the first reference block of the subblock and the second prediction value associated with the second reference block of the subblock;
predicting the subblock based on the determination of whether to perform BDOF for the subblock; and
decoding the coding block based on the predicted subblock.

10. The method of claim 9, further comprising:
obtaining the value based on a parameter set or a slice header; and
determining whether the size of the coding block is less than the value based on the comparison between the size of the coding block and the value, wherein the determination of whether to enable BDOF for the coding block is based on whether the size of the coding block is less than the value.

11. The method of claim 9, further comprising:
determining the first prediction value based on at least one sample value of a first plurality of sample values in the first reference block of the subblock, wherein the first reference block is associated with a first reference picture list; and
determining the second prediction value based on at least one sample value of a second plurality of sample values in the second reference block of the subblock, wherein the second reference block is associated with a second reference picture list, and wherein the first reference picture list and the second reference picture list are different.

12. The method of claim 9, further comprising:
determining an inter prediction mode for the coding block, wherein the determination of whether to enable BDOF for the coding block is further based on the determined inter prediction mode, and wherein the determined inter prediction mode for the coding block is an advanced temporal motion vector prediction (ATMVP) mode, a spatial-temporal motion vector prediction (STMVP) mode, a frame-rate up conversion (FRUC) mode, or an affine mode.

13. An apparatus for video encoding, comprising one or more processors, wherein the one or more processors are configured to:
obtain a size of a coding block, wherein the coding block comprises a subblock;
determine whether to enable bi-directional optical flow (BDOF) for the coding block based on a comparison between the size of the coding block and a value;
determine whether to perform BDOF for the subblock of the coding block based on the determination of whether to enable BDOF for the coding block and based on an extent of a prediction similarity associated with the subblock, wherein the one or more processors are configured to:
  based on a determination to enable BDOF for the coding block, obtain a first prediction value associated with a first reference block of the subblock and a second prediction value associated with a second reference block of the subblock; and
  determine the extent of the prediction similarity associated with the subblock based on the first prediction value associated with the first reference block of the subblock and the second prediction value associated with the second reference block of the subblock;
  predict the subblock based on the determination of whether to perform BDOF for the subblock; and
  encode the coding block based on the predicted subblock.

14. The apparatus of claim 13, wherein the one or more processors are configured to:
  obtain the value based on a parameter set or a slice header; and
  determine whether the size of the coding block is less than the value based on the comparison between the size of the coding block and the value, wherein the determination of whether to enable BDOF for the coding block is based on whether the size of the coding block is less than the value.

15. The apparatus of claim 13, wherein the one or more processors are configured to:
  determine that BDOF is to be performed for the subblock based on the comparison between the size of the coding block and the value; and
  refine a motion vector associated with the subblock of the coding block using gradients associated with a location in the subblock.

16. The apparatus of claim 13, wherein the one or more processors are configured to:
  determine the first prediction value based on at least one sample value of a first plurality of sample values in the first reference block of the subblock, wherein the first reference block is associated with a first reference picture list; and
  determine the second prediction value based on at least one sample value of a second plurality of sample values in the second reference block of the subblock, wherein the second reference block is associated with a second reference picture list, and wherein the first reference picture list and the second reference picture list are different.

17. The apparatus of claim 13, wherein the one or more processors are configured to:
  determine a sum of absolute difference (SAD) based on the first prediction value and the second prediction value, wherein the extent of the prediction similarity associated with the subblock is determined based on the SAD.

18. A method for video encoding, comprising:
  obtaining a size of a coding block, wherein the coding block comprises a subblock;
  determining whether to enable bi-directional optical flow (BDOF) for the coding block based on a comparison between the size of the coding block and a value;
  determining whether to perform BDOF for the subblock of the coding block based on the determination of whether to enable BDOF for the coding block and based on an extent of a prediction similarity associated with the subblock, wherein the method further comprises:
    based on a determination to enable BDOF for the coding block, obtaining a first prediction value associated with a first reference block of the subblock and a second prediction value associated with a second reference block of the subblock; and
    determining the extent of the prediction similarity associated with the subblock based on the first prediction value associated with the first reference block of the subblock and the second prediction value associated with the second reference block of the subblock;
  predicting the subblock based on the determination of whether to perform BDOF for the subblock; and
  encoding the coding block based on the predicted subblock.

19. The method of claim 18, further comprising:
  determining the first prediction value based on a first plurality of sample values in the first reference block of the subblock, wherein the first reference block is associated with a first reference picture list; and
  determining the second prediction value based on a second plurality of sample values in the second reference block of the subblock, wherein the second reference block is associated with a second reference picture list, and wherein the first reference picture list and the second reference picture list are different.

20. The method of claim 18, further comprising:
  determining an inter prediction mode for the coding block, wherein the determination of whether to enable BDOF for the coding block is further based on the determined inter prediction mode, and wherein the determined inter prediction mode for the coding block is an advanced temporal motion vector prediction (ATMVP) mode, a spatial-temporal motion vector prediction (STMVP) mode, a frame-rate up conversion (FRUC) mode, or an affine mode.

* * * * *